United States Patent
Kütt et al.

(10) Patent No.: US 11,138,544 B2
(45) Date of Patent: Oct. 5, 2021

(54) METHOD AND A DEVICE FOR FAST ENTRY AND STORAGE OF PARCELS

(71) Applicant: Cleveron AS, Viljandi (EE)

(72) Inventors: Arno Kütt, Viljandi vald (EE); Remi Lõssov, Viljandi (EE); Tarmo Must, Viljandi (EE); Harry Nuudi, Viljandimaa (EE); Mikk Noorkõiv, Viljandimaa (EE); Anu Koppel, Viljandi (EE); Rein Saetalu, Viljandimaa (EE); Mihkel Ilp, Tartumaa (EE)

(73) Assignee: Cleveron AS, Viljandi (EE)

( * ) Notice: Subject to any disclaimer, the term of this patent is extended or adjusted under 35 U.S.C. 154(b) by 225 days.

(21) Appl. No.: 16/206,322

(22) Filed: Nov. 30, 2018

(65) Prior Publication Data
US 2020/0062502 A1 Feb. 27, 2020

Related U.S. Application Data

(60) Provisional application No. 62/722,338, filed on Aug. 24, 2018.

(51) Int. Cl.
*G06F 7/00* (2006.01)
*G06Q 10/08* (2012.01)
*B65G 1/04* (2006.01)

(52) U.S. Cl.
CPC ........... *G06Q 10/08* (2013.01); *B65G 1/0485* (2013.01); *G06Q 10/087* (2013.01)

(58) Field of Classification Search
CPC .... G06Q 10/08; G06Q 10/087; B65G 1/0485; B65G 1/0407; B65G 1/04; G07F 17/12; G07F 11/165; G07F 11/42

USPC .......... 700/213–216, 218, 228, 231
See application file for complete search history.

(56) References Cited

U.S. PATENT DOCUMENTS

| | | | |
|---|---|---|---|
| 5,380,139 A | 1/1995 | Pohjonen et al. | |
| 5,599,154 A | 2/1997 | Holscher et al. | |
| 8,919,637 B2 | 12/2014 | Kim | |
| 2005/0002762 A1 | 1/2005 | Gambarelli | |
| 2005/0053450 A1 | 3/2005 | Kantola et al. | |
| 2005/0095095 A1 | 5/2005 | Hansl | |
| 2006/0058912 A1* | 3/2006 | Karlen | F41A 9/20 700/214 |
| 2006/0102433 A1 | 5/2006 | Ueda | |
| 2006/0285948 A1 | 12/2006 | Tsujimoto et al. | |
| 2007/0140817 A1 | 6/2007 | Hansl | |
| 2008/0279669 A1 | 11/2008 | Hanel | |
| 2009/0028675 A1 | 1/2009 | Tsujimoto | |
| 2010/0307989 A1 | 12/2010 | Hanel | |

(Continued)

FOREIGN PATENT DOCUMENTS

| | | |
|---|---|---|
| EP | 1726539 A1 | 12/2005 |
| JP | 2009029568 A | 2/2009 |

(Continued)

OTHER PUBLICATIONS

European Patent Office, European search report dated Jul. 4, 2019 in the Europan patent application No. 19160787.8, 2 pages.

*Primary Examiner* — Yolanda R Cumbess
(74) *Attorney, Agent, or Firm* — Meunier Carlin & Curfman LLC

(57) ABSTRACT

A parcel terminal system and method are provided to allow fast loading of parcels on storage space of a parcel terminal.

8 Claims, 15 Drawing Sheets

(56) References Cited

U.S. PATENT DOCUMENTS

| | | |
|---|---|---|
| 2014/0023462 A1 | 1/2014 | Lalesse |
| 2014/0034589 A1 | 2/2014 | Hancock et al. |
| 2014/0037404 A1 | 2/2014 | Hancock et al. |
| 2014/0212250 A1 | 7/2014 | Wolter |
| 2014/0212257 A1 | 7/2014 | Yamashita |
| 2015/0151930 A1 | 6/2015 | Kollmuss et al. |
| 2015/0259141 A1 | 9/2015 | Yamada |
| 2015/0302351 A1 | 10/2015 | Cassady et al. |
| 2016/0244260 A1 | 8/2016 | Oshikawa et al. |
| 2017/0219616 A1 | 8/2017 | Pedrazzini |
| 2019/0256285 A1 * | 8/2019 | De Vries ................. B65G 1/06 |

FOREIGN PATENT DOCUMENTS

| | | |
|---|---|---|
| KR | 20160094231 A | 8/2016 |
| NL | 7314642 A | 5/1974 |

* cited by examiner

Fast-loading position I:

Fast-loading position II:

METHOD AND A DEVICE FOR FAST ENTRY AND STORAGE OF PARCELS

PRIORITY

This is a non-provisional application of the provisional application No. 62/722,338 filed on 24 Aug. 2018, of which this application claims priority, and the contents of which is incorporated herein by reference.

FIELD OF INVENTION

This disclosure relates to self-service parcel terminals and lockers, more specifically to the field of methods for sending, receiving and storing parcels, packages, mail, and other postal objects. A unique parcel-entry logic and machine construction enabling fast entry and storage of parcels is disclosed.

BACKGROUND

Different parcel terminal solutions and processes used to control inserting and discharging postal objects are known from the prior art. Generally, each parcel is stored in a separate locker or shelf. The main drawback of the known solutions is that inserting and/or retrieving a larger number of parcels one by one is too slow and may take hours if the user needs to insert and/or collect large numbers of postal objects.

For example, US 20162044260 discloses an automatic warehouse including a storage shelf and a carriage device that carries a package. The carriage device includes a horizontal guide member located inside of the storage shelf and extending in a lateral direction, a prop inside of the storage shelf and supporting the horizontal guide member, a cart that travels along the horizontal guide member, a vertical guide member connected to the cart at an intermediate position, and a lift stage guided by the vertical guide member. The automatic warehouse further includes a transfer device attached to the lift stage.

US 20150259141 discloses a transferring apparatus including an elevating platform, a pair of side arms that are placed on the elevating platform and are each capable of stretching toward and retracting from both sides of a package, and a lower conveyor that is placed on the elevating platform. At least either one of the pair of the side arms is movable in a left-and-right direction orthogonal to a stretching-and-retracting direction of the side arm. The side arm that is movable in the left-and-right direction includes a base member that is movable in the left-and-right direction. The base member of the side arm includes a front guide leg-member and a rear guide leg-member that are provided to respective ends in the stretching-and-retracting direction of the base member on the lower side thereof. The lower conveyor is provided below a base body member between the front guide leg-member and the rear guide leg-member.

US 20150302351 discloses a carousel-like system used instead of a conventional parcel system based on a shelf system. Compared to the generally known solutions where each parcel is stored on a shelf in a separate locker or container with a door, the shelves in this system form a conveyor system moving circumferentially and multiple doors located one above the other for inserting and retrieving parcels have been provided at the access point of the storage compartment.

The shortcoming of the currently known solutions is that they are very time-consuming because the user can only insert or retrieve one parcel at a time. During every insertion and retrieval, the user has to wait until the shelf system moves into an appropriate position and a corresponding door opens.

U.S. Pat. No. 8,919,637 discloses a parcel storage dynamically allocating storage space for parcels. In order to ensure highest capacity, a system of shelves is used inside the parcel storage apparatus for storing parcels of variable size. However, there is still the drawback in this solution in that because of sequential insertion or discharge of several parcels requires the parcels are transported to the shelves or from the shelves into the discharge space one by one.

Accordingly, there is a need for a parcel storage device and a method for using such device that would allow faster and more time efficient insert/discharge of the parcels/postal objects. Especially so, as in today's world storage/delivery devices for all kind of postal objects, including food and perishables, are used more and more as customers are buying items from internet increasingly often. As result, a courier may have hundreds of objects to be stored in a parcel storage device at a time and the speed of the storing process of the device becomes important.

SUMMARY OF THE INVENTION

It is an object of this invention to provide a device and method to address the flaws in currently existing art.

It is an object of this invention to provide a safe solution for inserting and retrieving any postal packages in and from a parcel terminal that saves the user's time, especially in cases when the user wishes to insert or retrieve several packages sequentially at a time.

It is an object of this invention to provide a device and a method for fast deposit of packages of parcels into a storage space.

It is an object of this invention to provide a parcel terminal for inserting and receiving parcels, said terminal comprising: at least one insert and discharge area for user identification and parcel insert and/or retrieval; a frame comprising two rows of columns suitable for storing a multitude of empty platforms and/or parcel containing platforms, wherein at least one column is accessibly connected to the at least one insert and discharge area; and a mast moving along a corridor between the two rows, and comprising at least two loaders attached on opposite sides of the mast and being capable to independently move vertically along the mast and independently horizontally extend toward either of the column rows; wherein a width of the loaders and a width of the mast is such that when one of the loaders is positioned at the column with an access to the at least one insert and/or discharge area, the other loader on the opposite side of the mast by default is positioned at a fast-load column, thereby allowing simultaneous loading at the at least one insert and discharge area and unloading at the fast-load column.

It is another object of this invention to provide a method to operate a parcel terminal system comprising a parcel terminal and computer implemented controls, said method comprising the steps of: a) inserting a parcel into or onto an empty platform provided on an insert and discharge area; b) allowing the parcel terminal system to load the platform with the parcel from the insert and discharge area onto a first loader simultaneously as the parcel terminal system loads an empty platform from a column onto a second loader; c) allowing the first loader with the parcel containing platform to move next to another column having empty storage space and upload the platform with the parcel on the storage space, and simultaneously allowing the second loader to load the empty platform on the insert and discharge area for another parcel to be inserted into or onto the platform; repeating the steps b) and c) until no empty storage space is available.

It is an object of this invention to provide a computer controlled method to operate a parcel terminal system comprising a parcel terminal and computer implemented controls, said parcel terminal comprising two column rows and a corridor in between the rows, said column rows comprising a multitude of columns having equal width in direction of the corridor and being suitable for storing a multitude of empty platforms configured to hold a parcel, and a first and a second vertically and horizontally moving loader attached on a mast configured to move along the corridor, and at least one insert and discharge area said method comprising the steps of: a) inserting a parcel into or onto an empty platform provided on an insert and discharge area; b) receiving data of location of empty platforms in the parcel terminal and based on the data initiate movement of the mast along the corridor to a position where the first loader locates in front of the insert and discharge area, and the second loader locates in front of a column with an empty platform; c) initiating the parcel terminal system to load the platform with the parcel from the insert and discharge area onto the first loader and to simultaneously load onto the second loader the empty platform from the column in front of which the second loader locates; d) receiving data of location of a column with empty space and initiating movement of the mast along the corridor to a position where the first loader with the parcel containing platform locates in front of the determined column having empty space and the second loader with the empty platform locates in front of the insert and discharge area; e) initiating the first loader to upload the platform with the parcel onto the empty space, and simultaneously the second loader to load the empty platform onto the insert and discharge area for another parcel to be inserted into or onto the platform; f) repeating the steps b) and e) until no empty columns are recognized.

It is yet another object of this invention to provide a method for providing multiple speeds for storing parcels in a parcel terminal, the speed comprising at least three modes; a fast mode, a quick mode and a normal mode, wherein in the fast mode a first parcel is inserted into or onto a first platform brought by a first loader to an insert and discharge area simultaneously as a second loader is retrieving an empty second platform from a fast-load column of the terminal, and wherein the first loader is unloading the first platform with the first parcel into a fast-load column simultaneously as the second loader provides the second empty platform to the insert and discharge area for a second parcel and when the second loader unloads the second parcel into the fast-load column the first loader simultaneously provides a third empty platform into the insert and discharge area for a third parcel, and wherein the process is repeated as long as there are empty storage spaces in the fast-load columns, in the quick-load mode a first parcel is inserted into or onto a first platform brought by a first loader to an insert and discharge area, the first loader is moving to closest possible quick-load column recognized to have empty storage space and the first platform with the first parcel is unloaded to the quick-load column and simultaneously the second loader loads an empty platform from a quick-load column, and wherein the second loader moves to provide the second empty platform into the insert and discharge area for inserting a second parcel into or onto the second platform, and wherein the second loader is moving to the closest possible quick-load column recognized to have empty storage space and the second platform with the second parcel is unloaded to the quick-load column and simultaneously the first loader loads an empty platform from a quick-load column, and wherein the process is repeated as long as there are empty storage spaces in the quick-load columns, and in the normal-load mode the two loaders are operating sequentially by retrieving an empty platform, inserting it to the insert and discharge area for a parcel, moving the platform with the parcel to closest possible normal-load column recognized to have empty storage area after which the second loader or the same first loader retrieves an empty platform and moves to bring the empty platform to insert and discharge area.

It is still another object of this invention to provide a non-transitory computer readable medium having stored thereon a set of computer readable instructions that, when executed by at least one processor, cause a computerized parcel terminal to at least: a) recognize an empty platform at an insert and discharge area and control inserting a parcel into or onto the empty platform; b) control the parcel terminal system to load the platform with the parcel from the insert and discharge area onto a first loader and simultaneously control the parcel terminal system to recognize and load an empty platform from a storage column onto a second loader; c) recognize empty storage space in another column and control moving the first loader with parcel containing platform to the recognized column and control uploading the parcel containing platform to the recognized empty storage space, and simultaneously control the second loader loading the empty platform on the insert and discharge area for another parcel to be inserted into or onto the empty platform; and d) control repetition of the steps b) and c) until no empty storage space is recognized.

It is a further object of this invention to provide a non-transitory computer readable medium having stored thereon a set of computer readable instructions that, when executed by at least one processor, cause a computerized parcel terminal to at least: a) cause a fast-loading mode, where two loaders are operating simultaneously loading a platform with parcel to an empty storage space and retrieving a next empty platform and bring it to insert and discharge area; b) recognize when no empty storage space is available for the fast-loading mode and switch the system to a quick-loading mode, where two loaders are operating sequentially loading a platform with parcel to a storage space and retrieving a next empty platform for the insert and discharge area; c) recognize when no empty storage space is available for quick-loading mode and switch the system to a normal-loading mode, where one loader is operating to load a platform with a parcel to a storage space and retrieving a next empty platform from the insert and discharge area; and d) cause transferring platforms with packages from any desired storage space to another space when the insert and discharge area is not in use.

DESCRIPTION OF DRAWINGS

The invention is now illustrated by means of the appended drawings.

Module I comprises the customer console 210. Module I which is the console containing module 510 has four column units (1A, 2A, 3A, 4A). Module II does not include a console, and therefore it is a non-console containing module 520. In this embodiment the non-console containing module 520 has three column units (1B, 2B and 3B). The dashed lines at the ends of the module I and II, indicate that further modules can be attached at these ends.

Figure 1:
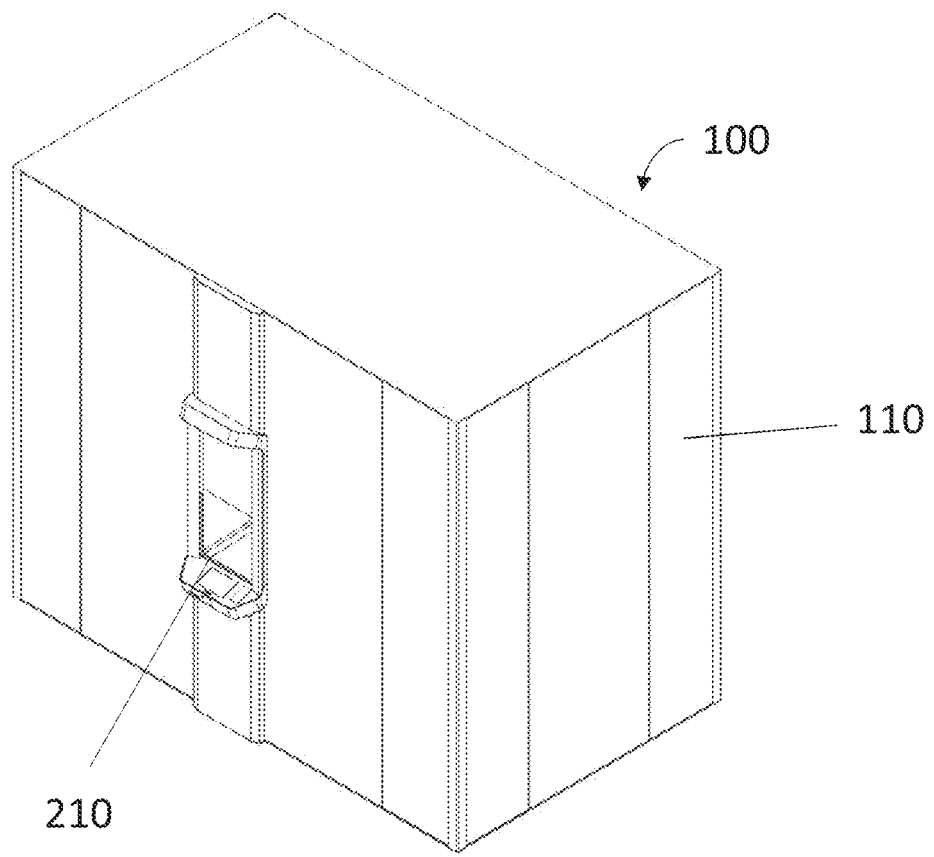
FIG. 1 shows a perspective view of the parcel terminal 100. The outer shell 110 and the customer console 210 are shown.
Figure 2:
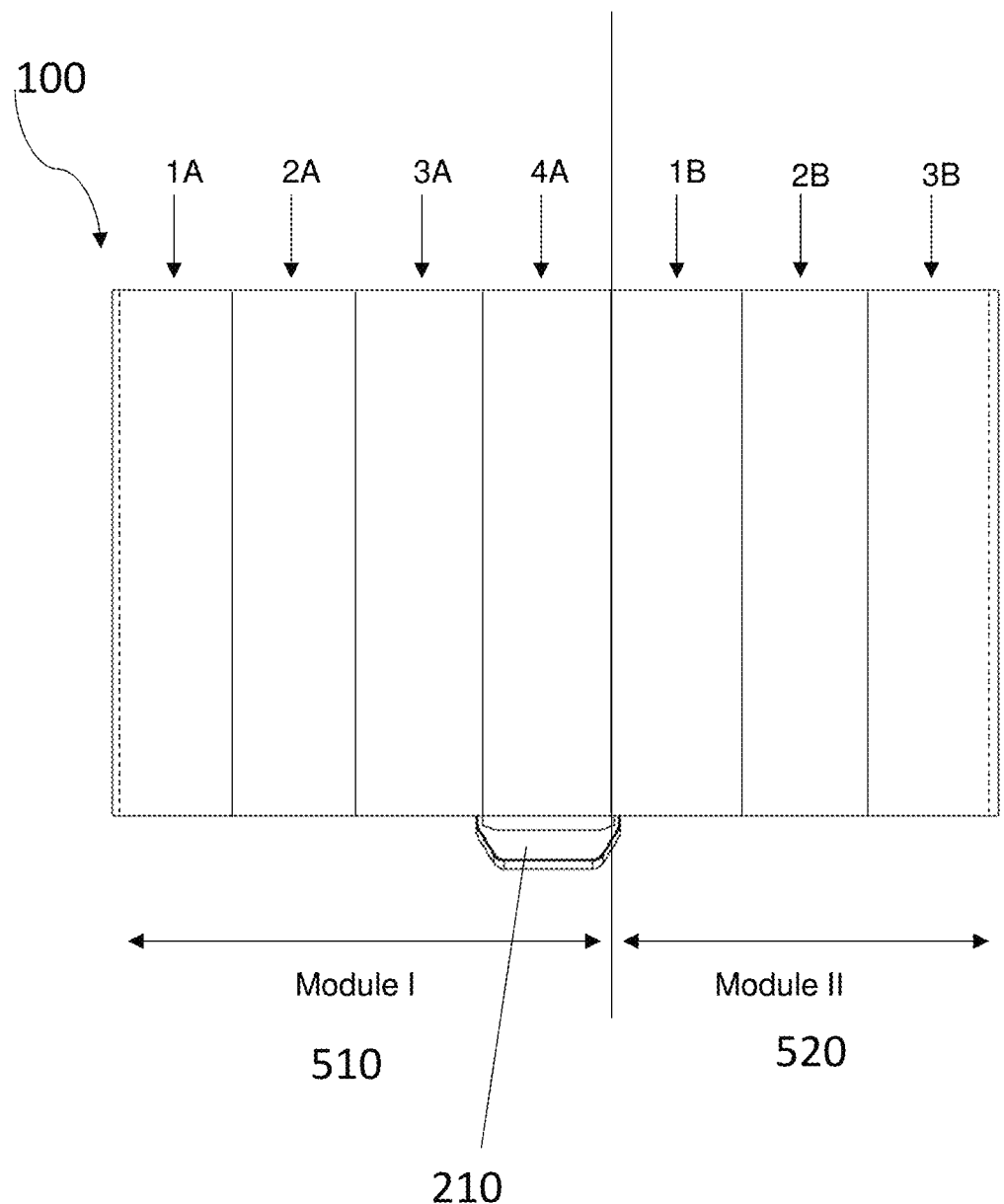
FIG. 2 shows a top view of a parcel terminal 100 with two modules (Module I and Module II) attached to each other.
Figure 3:
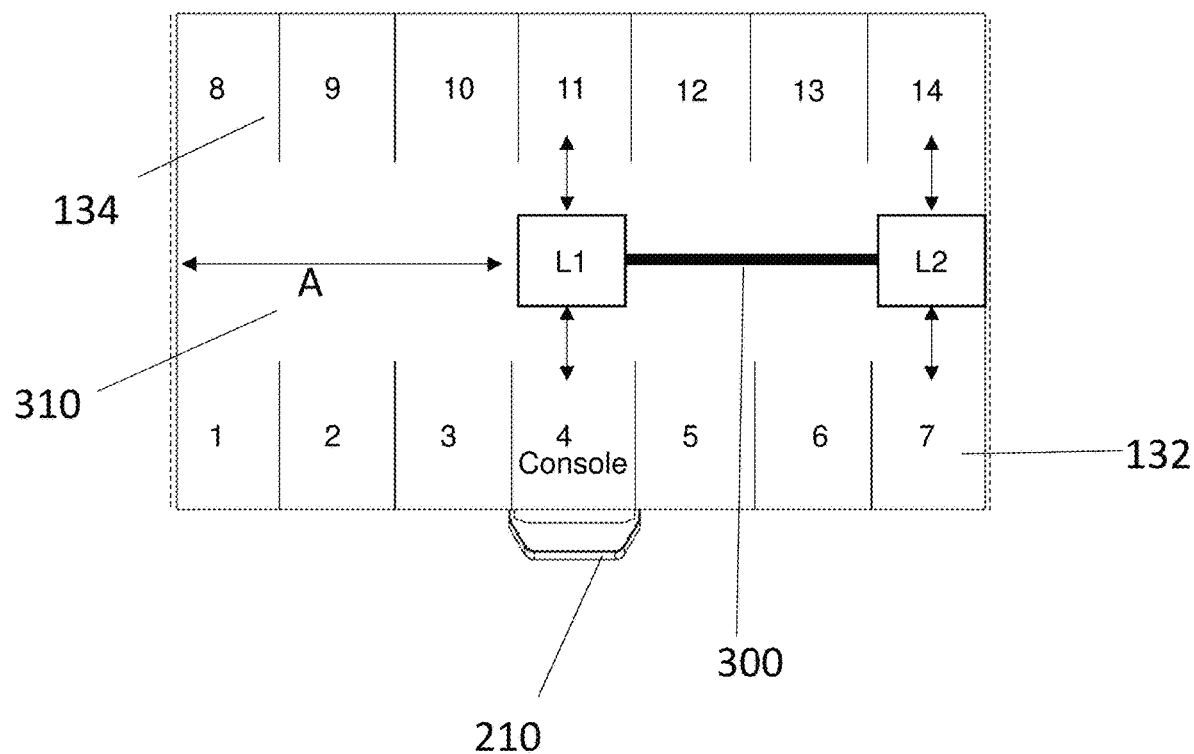

FIG. 3 shows a schematic top view into the parcel terminal 100 of FIG. 2 (i.e. ceiling shells are removed). Module I and II (shown in FIG. 2) are attached to each other such that the inner space is continuous as shown here. In essence, as many modules as desired can be attached to each other (see FIGS. 5A and B). The column units 1A, 2A, 3A and 4A of Module I of FIG. 2 are shown to have four columns (1,2,3,4) toward the wall that comprises the customer console 210, and four columns (8,9,10 and 11) toward the opposite wall. The column units 1B, 2B, 3B of Module II of FIG. 2 have three columns (5,6 and 7 shown here) toward the wall that has the customer console 210, and three columns (12, 13 and 14) toward the opposite wall. The columns toward the wall that comprises the customer console 210 (1-7) are called front-row columns 132. The columns toward the opposite wall are called back-row columns 134. In between the front row columns 132 and the back-row columns there is a corridor 310. Along this corridor 310 there is a bottom rail (320 see FIG. 8) along which a mast 300 moves. The movement direction of the mast 300 is shown in the figure with an arrow A. The mast 300 comprises two horizontally positioned loaders (here marked as L1 and L2) on its opposite sides. The loaders are capable of independently moving vertically along the mast (see FIG. 4). The loaders are also capable of independently moving horizontally in a direction perpendicular to the movement direction of the mast 300 in and out of the columns (horizontal movement is shown with arrows).

Figure 4:
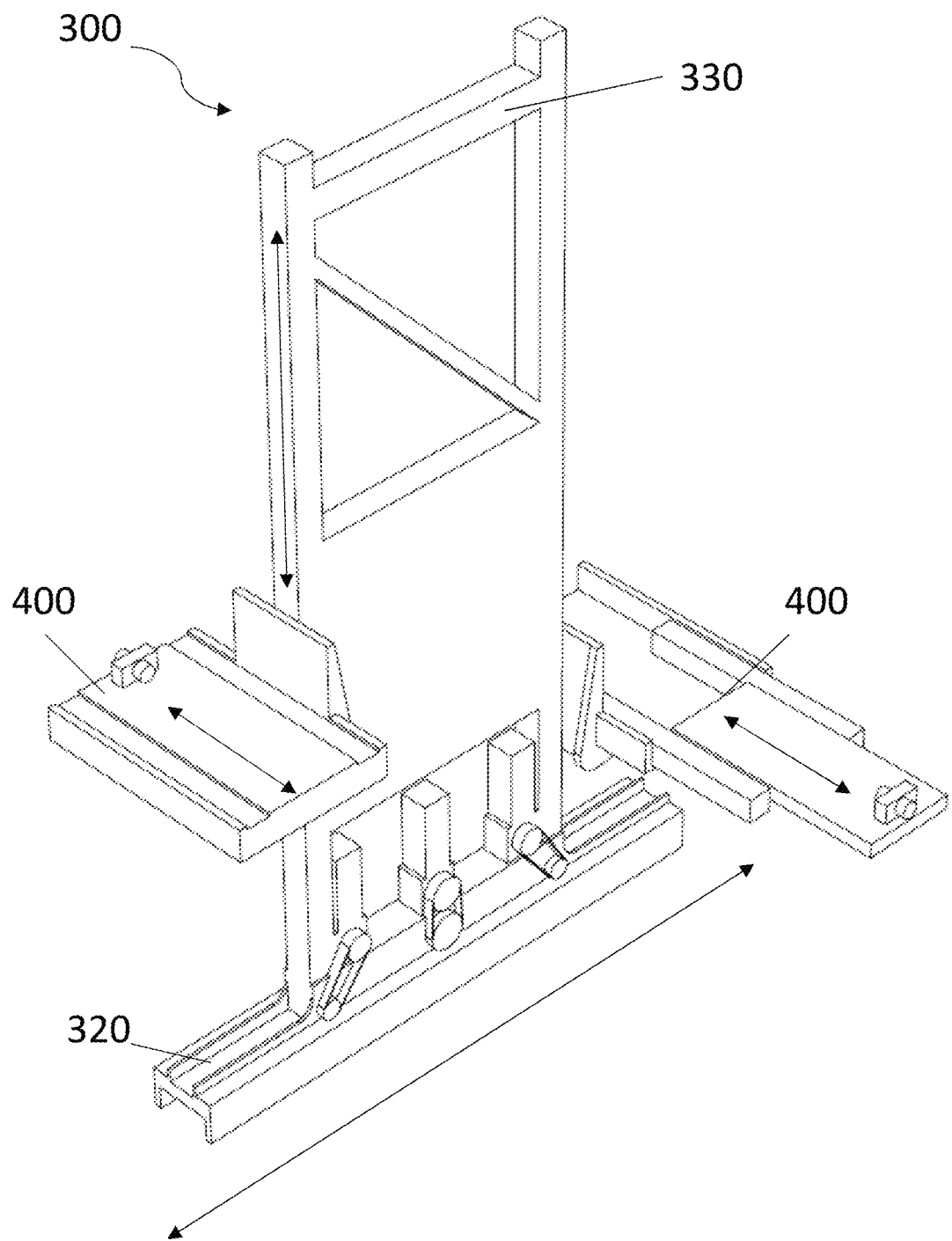

FIG. 4 shows a schematic side view of the mast 300. Two loaders 400 are attached on the opposite sides of the mast.

FIGS. 5A and B show alternative assemblies of the parcel terminal 100. In FIG. 5A the module that includes the console has seven column units or it may be built of two modules as shown in FIG. 3. Either way, the parcel terminal in this embodiment is composed of two four column unit modules on both sides of the seven column units. In FIG. 5B the parcel terminal is composed of two three column unit modules on both sides of the seven-column unit. Any number of additional modules may be attached on either side of the shown modules. The inner spaces of the modules would be continuous as is shown in FIG. 3.

FIGS. 6A and B illustrate the formation of three different speed zones for loading. In FIG. 6A, the mast 300 has been moved so that the loader L1 is positioned next to the console column. The dimensions of the mast and the loaders are so designed that the loader L2 is necessarily now at a column that is two columns over from the console. This means that loader L1 is in position to immediately enter the inner console, and draw a platform with a package inserted into the console. Simultaneously, during this action, the second loader L2 is capable of drawing an empty platform from the fast-load column it is at. Now the mast moves to position shown in FIG. 6B: the second loader L2 with an empty platform now moves to console position and is capable of receiving another parcel. Due to the dimensions of the mast 300 and the loaders, the first loader L1 is necessarily at a fast-loading column two columns away from the console in this case, and can store the parcel in the fast-load column (vertical movement of loader along the mast allows the loader to be at correct level to unload the platform 600 with the parcel to an empty space). After this L1 can draw an empty platform 600 from the same column (moving the height of the loader along the mast 300 would position the loader at the level of the empty platform). When the loader L2 has been loaded with a parcel at the console, the mast 300 will move such that the first loader L1 is at the console to allow a parcel to be loaded on the empty platform 600, as the loader L2 necessarily simultaneously moves to the fast-load column to be emptied. As is shown in the figure, the columns that locate two columns away from the console are 'fast-load' columns because either one of the loaders can operate at these columns simultaneously the other is operating at the console. The columns that are in between the fast-load columns and the console in the front row and the columns that are between the fast-load columns in the back row are called quick-load columns. When one loader is at a quick-load column the other one cannot operate at the console simultaneously which necessarily makes quick-load columns slightly slower to operate with. The modules that are on either side of the fast-load columns comprise only normal-load columns which are slower to operate than the quick- and fast-load columns. It is to be understood here that determination of how many quick-load columns there are between the console and a fast-load column depends on the width of the mast 300, the size of the loaders L1 and L2, and the size of the columns. However, the structure shown in this disclosure provides the fastest and most efficient loading.

Figure 7:
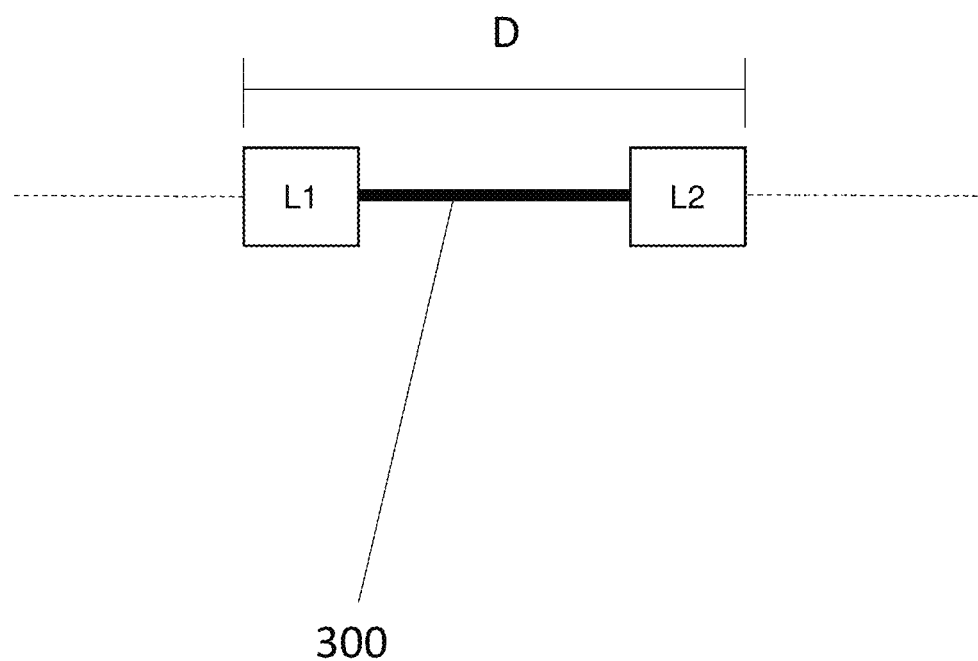

FIG. 7 shows a schematic side view of the mast 300 and the loaders L1 and L2. A distance between the outer edges of the loaders is shown as D. This distance is important in determining the location of fast-load columns. D has to be such that when one of the loaders L1 or L2 is at a console the other one is at the fast-load column.

Figure 8:
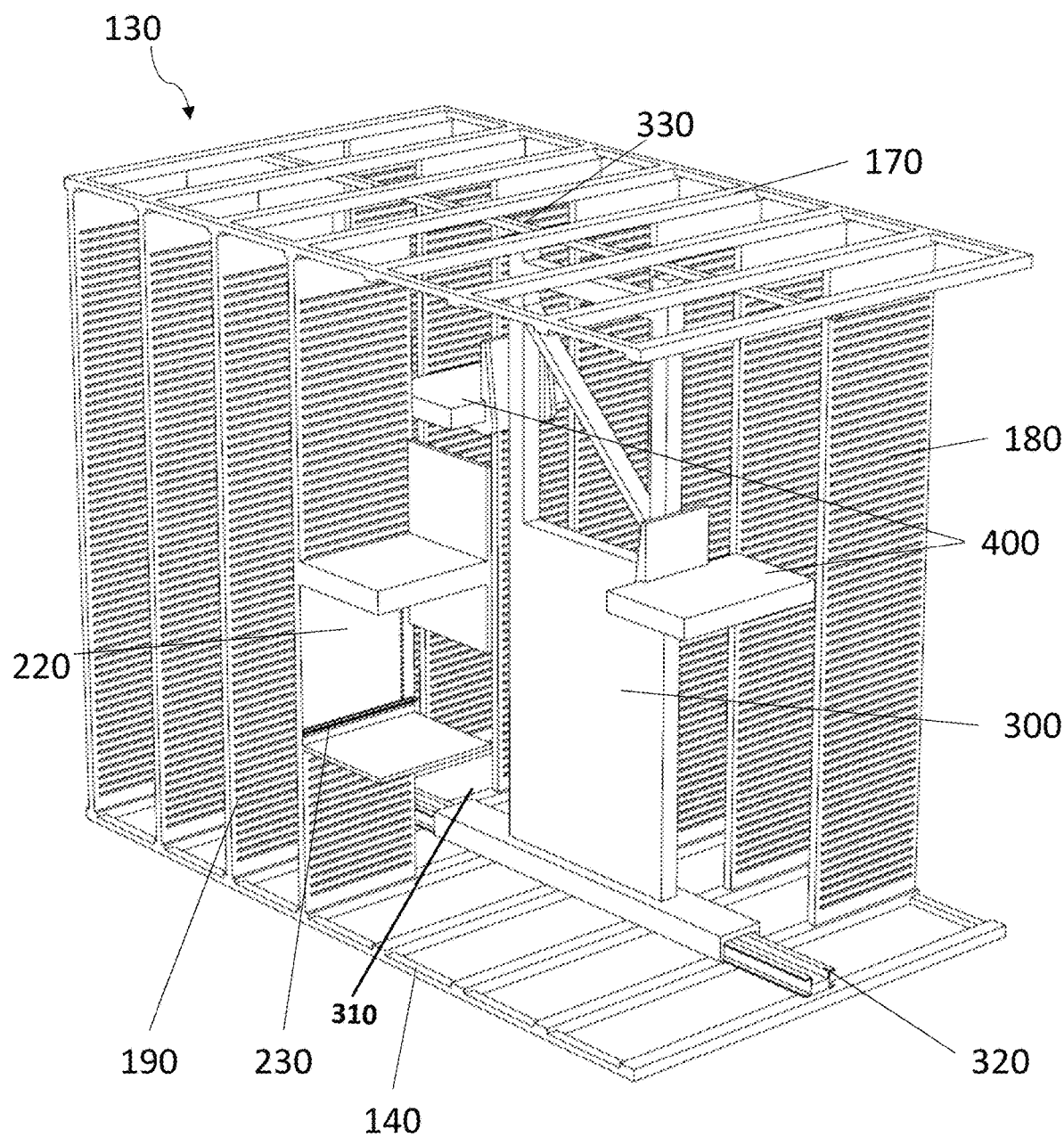

FIG. 8. is a detailed illustration of a partially exploded view of the parcel columns 130 of the parcel terminal 100. The figure shows a base frame 140, a ceiling frame 170, shelf posts 190, and a horizontal platform support frame 180 installed in between the shelf posts 190 for supporting platforms (the space between the rails is sometimes here called 'shelf' even if there is not necessarily an actual shelf). The figure shows also the inner console 220. Console rails 230 are shown inside the inner console 220 for receiving a platform. Underneath the console unit there is a platform support frame 180 shown. Corridor 310 is shown. The figure further shows the bottom rail 320, the upper rail 330, the mast 300 and the two loaders 400.

Figure 9:
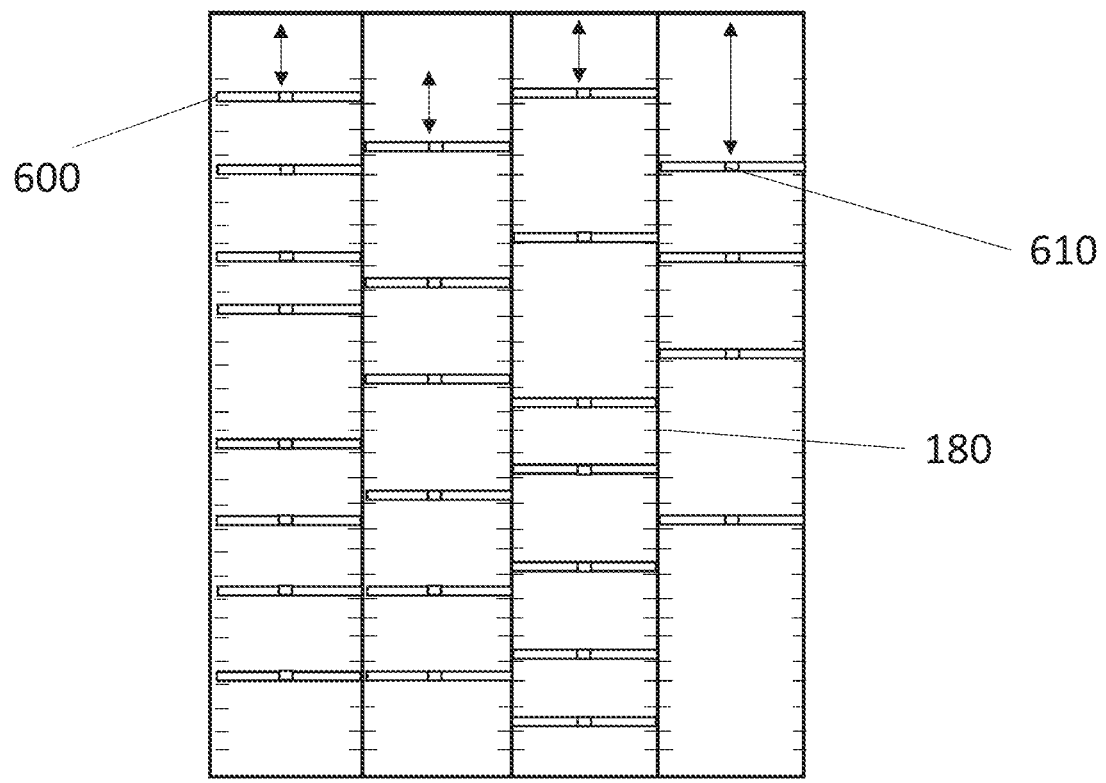

FIG. 9 shows a schematic illustration of inner side view of columns. The figure shows the platforms 600 and metallic plates 610 located at the end of the platform that is toward the corridor. The figure also shows the platform support frame 180. As is shown by the arrows a space on top of the platforms 600 may vary depending on size of parcel that is on the platforms (parcels are not shown in this figure. It is also understood that in order for the device and method of this disclosure to function, there must be empty platforms 600 inserted into the columns 130. Thus, some or even all of the platforms 600 shown in this figure may actually be empty platforms.

Figure 10:
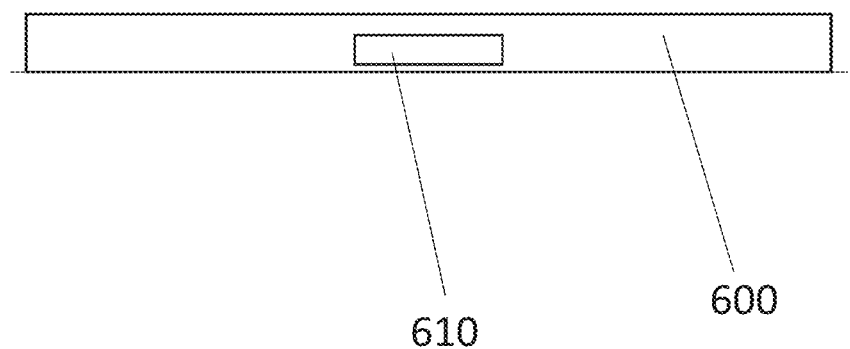

FIG. 10 shows an end view of a platform 600 with a metallic plate 610. In this embodiment the platform is a tray, but it may as well be a box or any kind of platform that can support the parcel and be supported by the platform support rails. Instead of support rails there may alternatively be hooks or similar tabs to support the platform. According to certain embodiments, the platform may be a temperature-controlled box, for example a cooling container, in case of food delivery.

Figure 11:
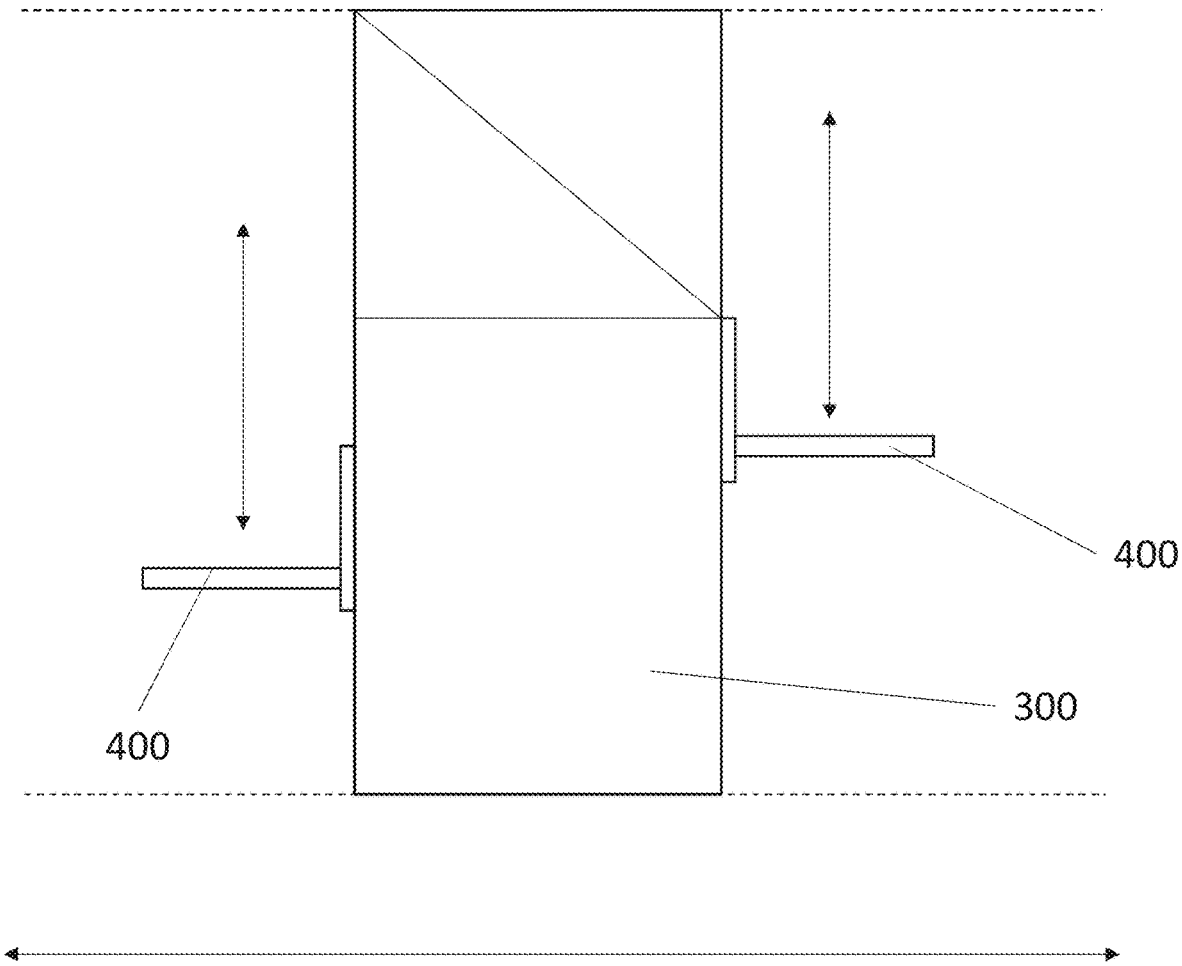

FIG. 11 shows a schematic illustration of the mast 300 and two loaders 400 attached to opposite sides of the mast 300. The loaders are capable of moving independently vertically along the mast 300 as shown by the arrows.

Figure 12:
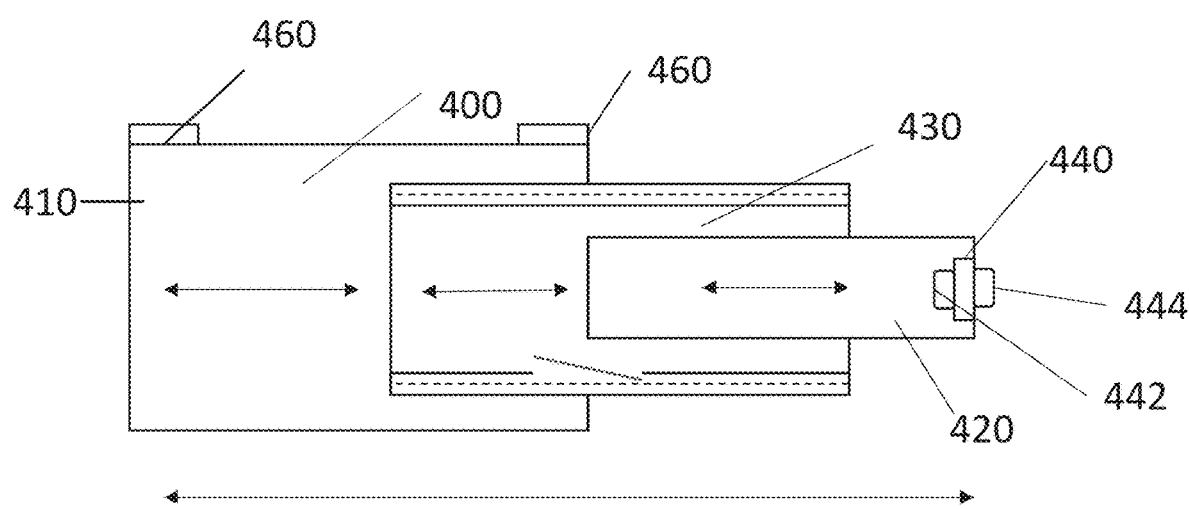

FIG. 12. shows a schematic illustration of a loader 400. The loader has an outer housing 410, a telescopic arm 430 and an inner loader 420. At the distal end of the inner loader there is magnetic head 440 comprising two electromagnets 442 and 444. In this embodiment the loader is fully extended, i.e. both the inner loader 420 and the telescopic arm 430 are extended. The magnetic head 440 is in its distal position. In this position the loader can fully extend preferably to the inner console 220 to deliver/reach a platform 600 therein. Cameras 460 are located on side of the outer housing 410.

Figure 13A:
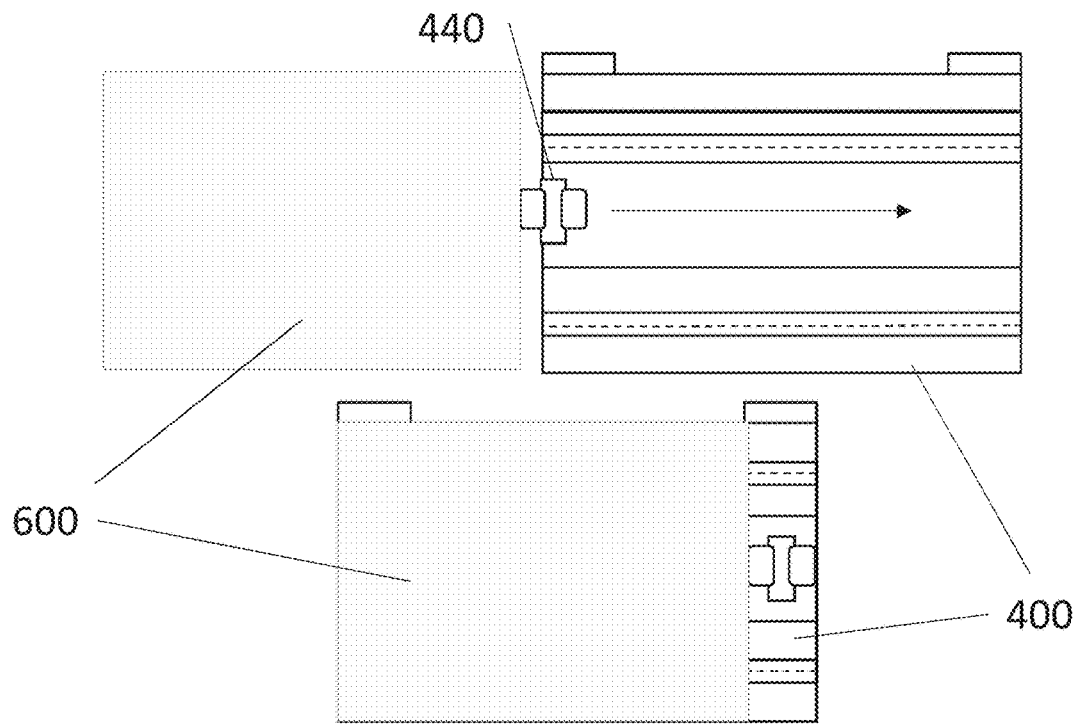
Figure 13:
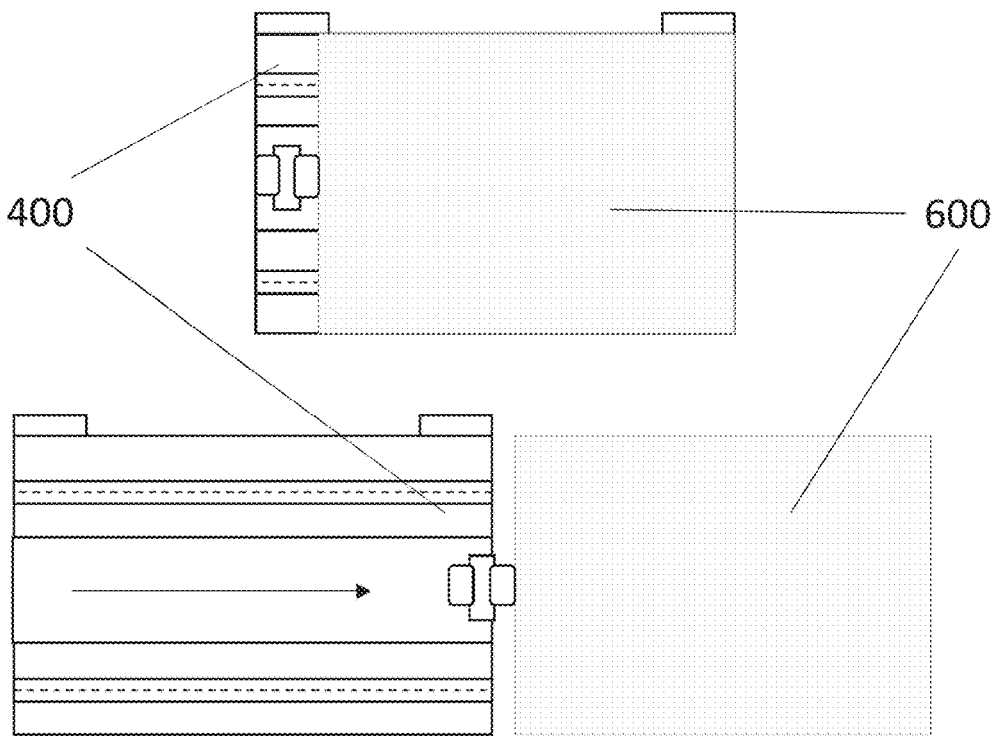

FIG. 13 A illustrates a situation (upper figure) where the magnetic head 440 is at a position where it can attach to a platform 600 (via magnetic plate not shown here) without the inner loader or the telescopic arm being extended. The lower figure in 13A illustrates how the magnetic head 440 has pulled the platform 600 onto the loader 400. This situation is preferable when the magnetic head pulls platforms from the columns (not from the console).

FIG. 13 B (upper figure) illustrates a situation where the platform 600 is on the loader 400 and (lower figure) the magnetic head 440 moves to push the platform 600 out of the loader 400 preferably into a column. Again, the telescopic arm or the inner loader need not to move in this case.

FIGS. 14 A and B show situations where a platform 600 on a loader 400 (14 A upper drawing) is moved preferably to the inner console by extending (14A lower drawing) the inner loader (underneath the platform 600) and the telescopic arm 430 and the magnetic head 440 attached to the platform 600 via its magnetic plate in its distal position. In the lower drawing of FIG. 14 A, the user of the parcel terminal 100 would see the platform 600 in the inner console 220, and insert a parcel on the platform 600. After the user inserts the parcel on the platform 600, the inner loader 420 and the telescopic arm 430 would be pulled back, and the platform 600 would locate on the loader 400. The loader 400 having the platform would then be moved to front of to a loading column 130 via the mast 300. Vertical movement of the loader 400 allows the platform 600 with the parcel to be inserted in an empty storage space having a suitable height.

Figure 14A:
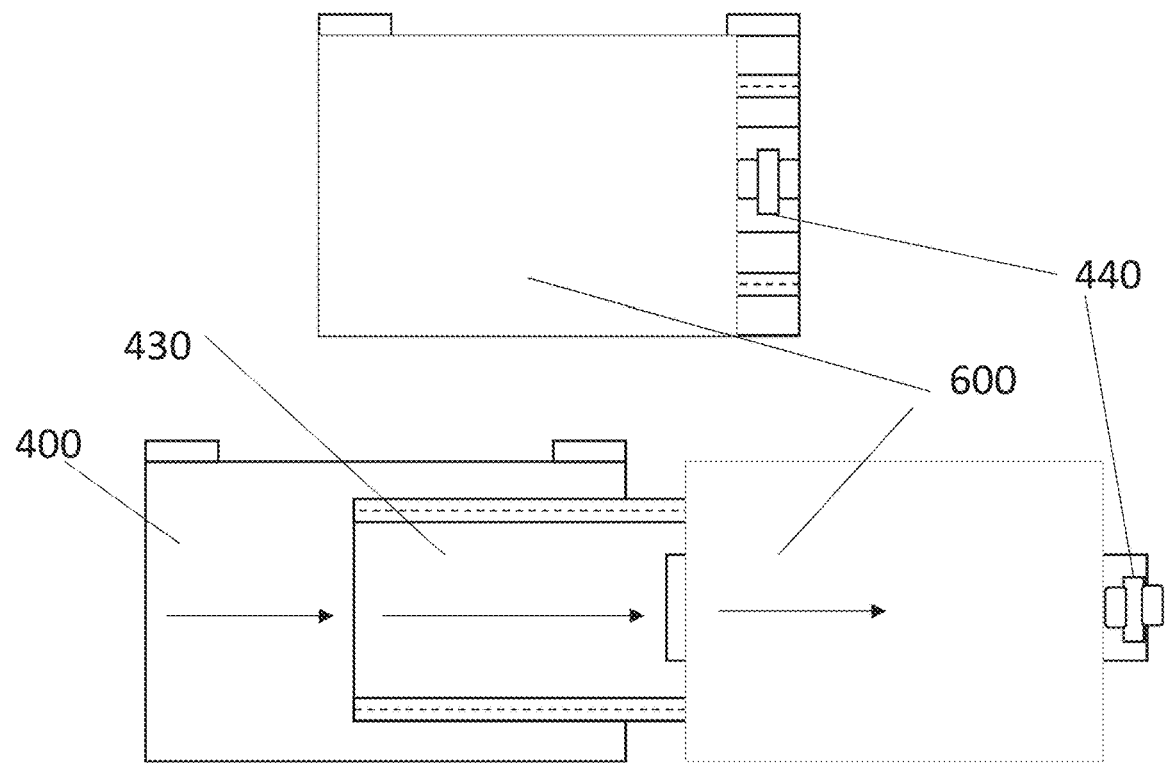
Figure 14B:
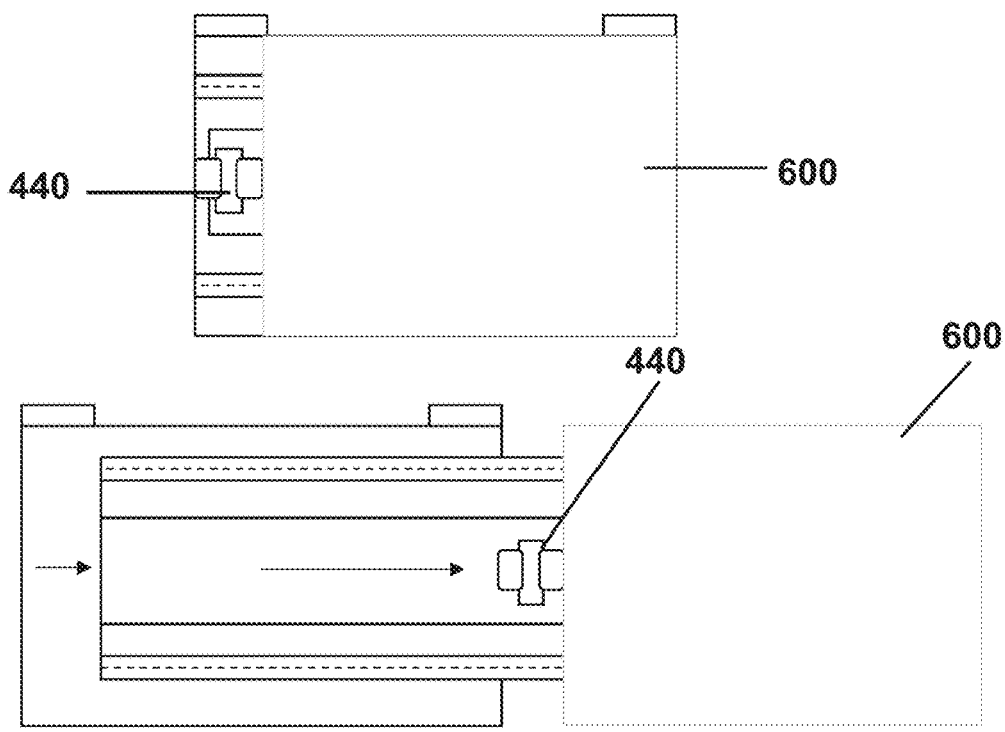

FIG. 14 B illustrates similar situation as FIG. 14A. However, in FIG. 14B the magnetic head 440 is on the other side of the platform 600. Therefore when the platform 600 is all the way out, the magnetic head 440 is not in its distal position but remains 'behind' the platform.

Figure 15:
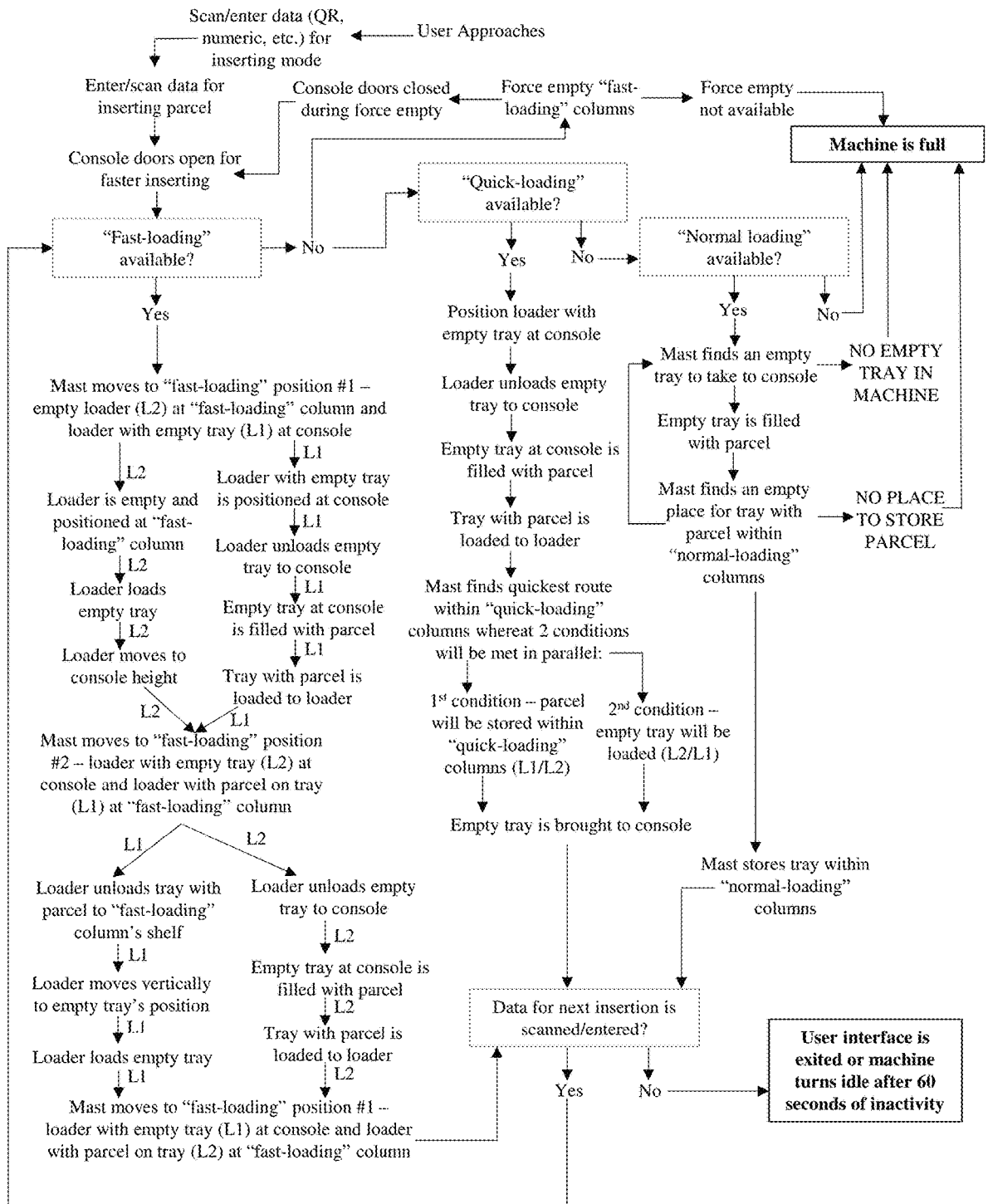

FIG. 15 shows decision-making process in the method.

DETAILED DESCRIPTION OF THE INVENTION

Now referring to the figures, the parcel terminal 100 according to this invention is constructed of one or more modules 500. The parcel terminal 100 comprises an outer shell 110, and an inner frame which comprises a multitude of parcel columns 130 for storing parcels of different sizes. The parcels are stored on specifically designed platforms 600 that may be trays, a boxes, or similar objects. A moving mast 300 has two loaders 400 attached on opposite sides of the mast 300. The loaders 400 form a horizontal level capable of holding a platform 600. In certain embodiments the loaders 400 may have a closed horizontal surface (top and bottom), and in some other embodiments the loaders 400 may have open or partially open horizontal surfaces. The loaders 400 are capable of extending independently of each other at least in one horizontal direction toward a parcel column 130. The loaders 400 are also capable of moving independently of each other in vertical direction along the mast 300. The mast 300 is configured to move to a position where one of the loaders 400 can extend to an inner console 220 for retrieving or delivering a parcel while simultaneously allowing the second loader to be positioned at a parcel column 130 to deliver a parcel for storing or uploading an empty platform 600 for next parcel. The device and the method for operating the device are described in details below.

The advantage of the disclosed device and the method lies in the fact that the parcel delivery from the customer console 210 to the parcel columns 130 is extremely time efficient due to simultaneous operation of the two loaders 400 and application of computerized system controlling the operation of the terminal that allows choosing between three different speed zones for the storage. A first mode is called a fast mode, and the columns used during the fast mode are called fast-load columns (also fast-loading columns). A second mode is called quick mode, and the columns used during the quick mode are called quick-load columns (also quick-loading columns). A third mode is called a normal mode, and the columns used during the normal mode are called normal-load columns (also normal-loading columns). The device and method according to this invention allows a fast operation within about 3 to 15 seconds, more preferably about 5 to 10 seconds, and most preferably about 5 to 7 seconds from inserting a parcel to customer console 210 till the moment the parcel has been stored in a fast-load column. Depending on the size of the parcel terminal (height of the columns and number of the modules) fast-load columns are available for inserting hundreds of packages within a fast timeline. Such an improvement is beneficial for couriers delivering hundreds of postal parcels, such as Amazon, UPS, and others, on daily basis into parcel terminals.

In case the fast-load columns are full an alternative is to use quick-load columns, for which the timeline from customer console 210 to the column 130 is roughly 3-5 seconds longer; most preferably it takes between 7 and 10 seconds from inserting a parcel to customer console 210 till the moment the parcel has been stored in quick-load column. When compared to any currently available parcel terminal and methods used to operate them, using the fast-load columns of this invention reduces loading time remarkably (reduction of loading time to about one-third of present loading times is possible with the current invention as compared to prior known systems). Even the quick-load mode allows reduction of loading time to about one-half of known systems. Furthermore, the device and the method disclosed here, allows automatic moving of packages from the fast-load columns during idling times when packages are not inserted into the customer console 210 to normal-load columns with individual recorded location from which the parcel can be retrieved. This allows the fast-load columns to be available for next courier (customer). Accordingly, the system provides practically a constant availability of fast-load columns for extremely fast loading of large numbers of parcels into individual recorded locations in the parcel terminal. It is also possible to use the automated rearrangement of the parcels in the device during idling periods from fast-load columns to quick-load columns or to normal-load columns, or form quick-load columns to normal-load columns. It is possible to rearrange the parcels between any columns as needed. Thus, the system is very flexible.

The system provides even further flexibility in that the number of empty platforms, such as trays or boxes, can be increased or decreased when needed. For example, a situation may be that a courier informs that she/he is going to deliver a large amount of small parcels within certain time. The system can in such case be programmed to insert more empty platforms into a quick-load column to fit more small parcels there. Alternatively, if a courier informs that there is certain number of large parcels to be delivered, the system may move empty platforms out from the quick-load column to fit larger parcels into the column.

A further advantage of the system is that if one loader happens to be unfunctional the other loader would still work; this way the system will not be completely out of order for the time one loader is repaired.

To exemplify the benefits of this invention: if loading of a parcel takes 5 seconds, as is possible with this invention, it would take a courier approximately 8.3 minutes to store 100 parcels in the terminal. In a conventional system (prior art systems) storing 100 parcels would take about 25 minutes. Often times a courier may have for example 300 parcels to store and with prior art devices the loading process would take an hour and 15 minutes, while with the invention of this disclosure 300 parcels can be stored in 25 minutes. Thus, it is evident that this method provides an enormous benefit in saving of time.

In certain embodiments the columns 130, any one of the three zones (fast-load, quick-load, and normal-load) may be variably temperature-controlled. Thus, for example in case where food or perishables are delivered into the parcel terminal 100, the platforms 600 may be temperature-controlled boxes, and the platforms may be loaded to columns in any one of the three zones with suitable temperature. The customer could have an option to key in the customer console 210 any specifics, such as temperature requirement. The system would provide suitable platform and recognize the requirement when determining the space where the platform with the parcel is to be stored.

Description of the Inner Frame:

Referring to FIG. 2, a smallest possible parcel terminal 100 consists of two modules 510 and 520. Module 510 comprises a console unit (includes the inner console 220 and the customer console 210), while module 520 does not have the console unit. According to a preferred embodiment, as is shown in FIG. 2, console containing module 510 has four column units, one of which includes the console unit, and non-console containing module 520 contains three-column units.

Figure 5:
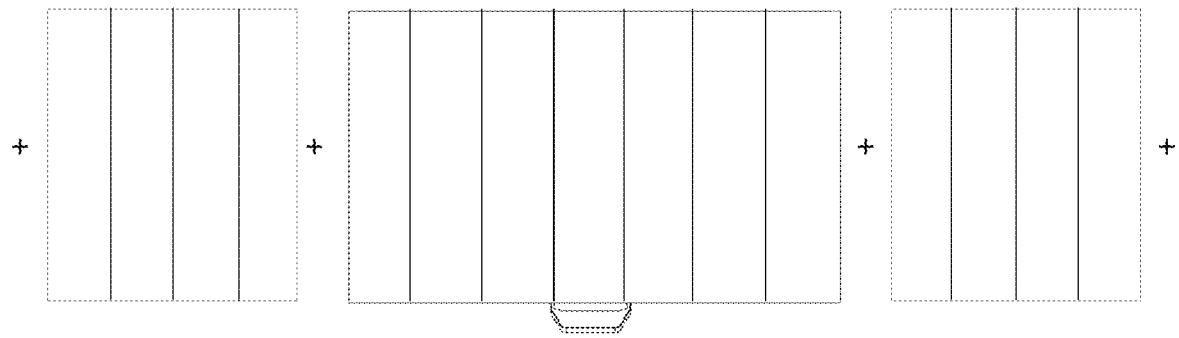
Figure 5:
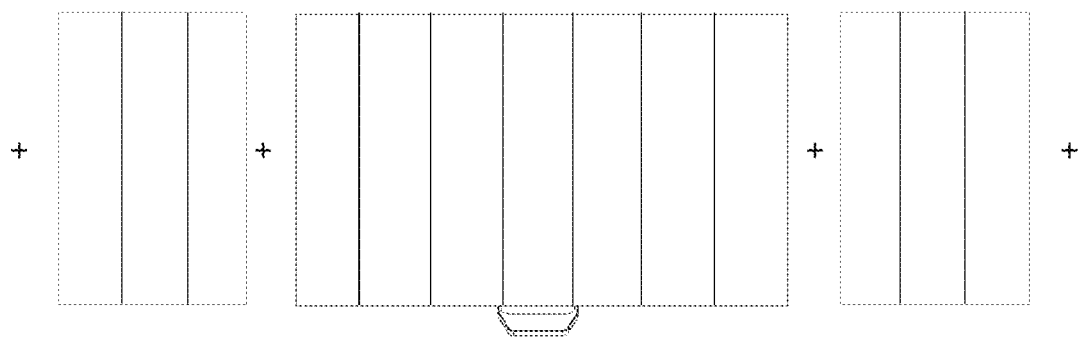

However, the console containing unit (comprises inner console 220 and customer console 210) can be fitted into any of the modules, and therefore according to another embodiment the console comprising unit may have a different number of columns (i.e. larger or smaller number than shown in FIG. 2). FIGS. 5 A and B illustrates alternative assemblies. A desired number of modules can be combined to achieve a desired length of the terminal as long as one of the modules is a console comprising module.

FIG. 7 illustrates the distance D between the outer edges of the two loaders. The distance D is defined by the width of the mast 300 and the width of the two loaders. This distance D is needed in defining the structure and dimensions of the system.

Figure 6:
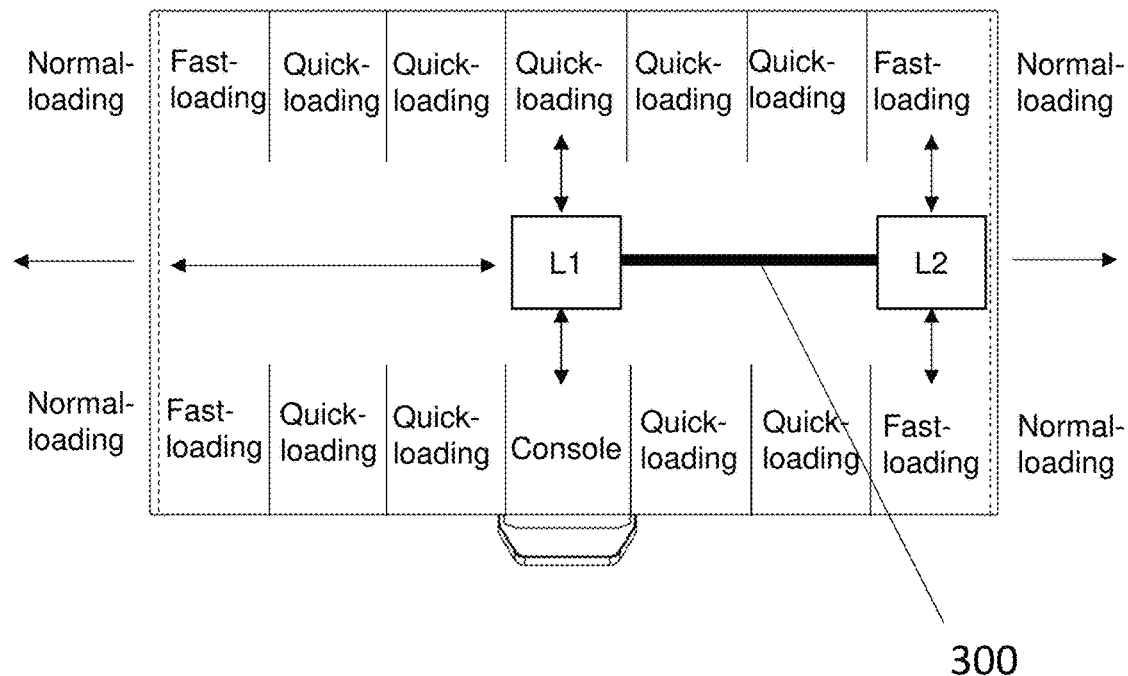
Figure 6B:
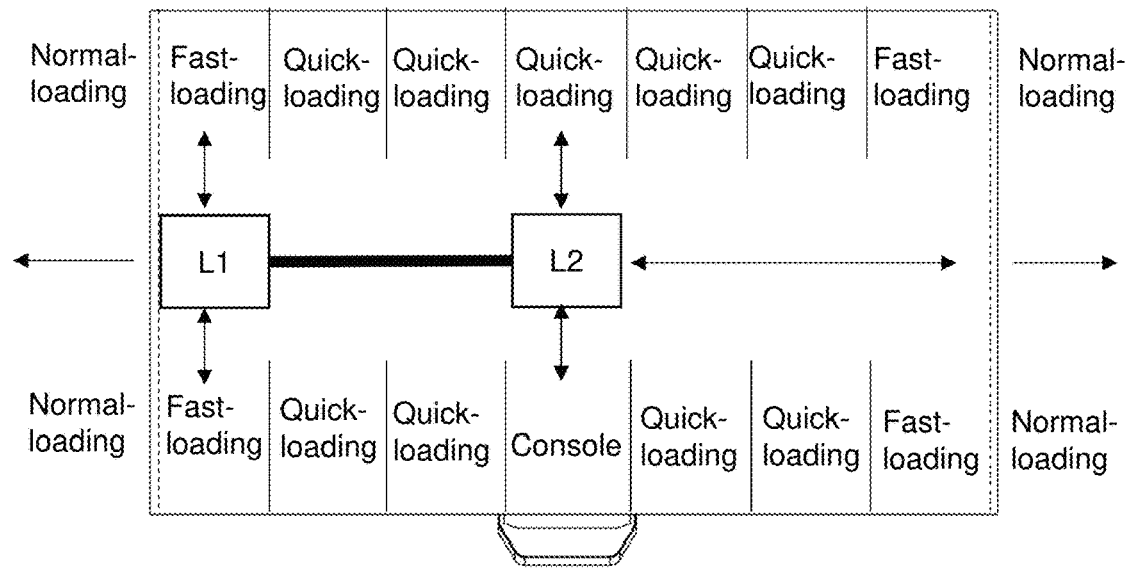

As a preferred embodiment FIGS. 6A and B illustrates how the structure and dimensions of the mast 300 and the loaders 400 define different loading speed zones for the columns. The device as described here allows fast loading, quick loading, and normal loading in specific columns as is shown in FIGS. 6A and B. It becomes clear also from FIGS. 6 A and B, why the minimum number of column units in the parcel terminal 100 has to be seven, and why the console column has to locate such that there are three columns on its both sides, whether or not in same module as the console column. It is also evident that if the distance D as shown in FIG. 7 would be smaller or larger and/or if the width of the columns would be smaller or larger, the number of fast-load and quick-load columns could be modified to be something else. However, the system as shown in FIGS. 6A and 6B is the most efficient.

Now turning into more detailed description of the inner frame of the parcel terminal 100. One embodiment of the parcel columns 130 is shown in FIG. 8. The inner frame is formed of a base frame 140, a ceiling frame 170 and a multitude of shelf posts 190. The shelf posts 190 form a space for front row columns 132 (see FIG. 3) and back row columns 134 (see FIG. 3) in between of the shelf posts. According to one embodiment as shown in FIG. 8, there are platform support rails 180 attached in between the shelf posts 190 to provide support for platforms 600 to store parcels. The platforms 600 may be trays or boxes or any suitable form of platform that can hold a parcel. It is to be also understood that instead of rails the platform support could be provided by other means, such as hanging hooks, nails, tabs or other suitable means. The device in FIG. 8 consists of seven columns in the front row and seven in the back row. A console unit locates in the middle of the front row column 132. The console unit comprises a customer console 210 hinged with an inner console 220. There is an access to the inner machinery of the parcel terminal 100 through the console unit. As is shown in FIG. 8, there is a bottom rail 320 running in between of the front row columns 132 and back row columns 134. A mast 300 is driving along this rail. The mast 300 comprises two horizontal loaders 400 attached on opposite sides of the mast 300 such that they extend from the mast 300 in parallel to the direction of the bottom rail 320 (or the movement direction of the mast 300). The loaders 400 are capable of moving vertically along the mast 300 independently of each other. The loaders are also capable of extending horizontally perpendicularly to the direction of the bottom rail 320 (i.e. toward the columns) independently of each other.

The base frame 140 of each module is equipped with adjustable legs (not shown) for levelling the entire plane of the parcel terminal 100 before anchoring it onto the floor. Anchoring is performed through the adjustable legs.

End modules (i.e. the modules that are connected only to one other module) additionally have diagonal struts at their free ends, which make the ends of the parcel terminal rigid.

Description of the Outer Shell:

The outer shell 110 is composed of sandwich panels, which are fixed onto the inner frame. The panels can be covered as desired, e.g. different color choices, advertisement areas etc. If the parcel terminal 100 is located in a separate room such that only the customer console 210 is visible to customers, the outer shell 110 may only consist of panels for the customer console 210.

Description of the Customer Console:

The parcel terminal 100 has a console comprising module and the console comprising module has at least one customer console 210 and an inner console 220. The customer console 210 serves as an insert and discharge area for the parcels and it is a separate unit and it is hinged and can be opened up, if necessary, in order to gain access to the interior of the parcel terminal 100. According to a preferred embodiment the customer console 210 comprises a touch screen, two scanners, an NFC (near field communication) module and an ADA (Americans with Disabilities Act)-compliant headphone jack with a volume control button. The customer console 210 further comprises a motion detector, a speaker and a microphone.

Description of the Inner Console:

The inner console 220 of the console comprising module locates in the front column row and has at least three shelf columns on its both sides. FIGS. 3, 5A and 5B show various assemblies of the modules in relation to the console column. The inner console 220 comprises two vertical console posts. Horizontal console rails 230 (shown in FIG. 8) are installed between the two console posts to hold a platform placed inside the inner console 220.

The console posts are connected to an inner door module located on the corridor 310 side of the inner console 220. The inner door module is equipped with measuring curtains and parcel oversize detectors. The door module also includes a back door and its rails and door motor. A ceiling light module is connected to the console posts at their upper end and it holds the console light fitting and a camera for taking pictures of parcels on the platform. According to one embodiment the parcel terminal 100 has one inner console 220 (and one corresponding customer console 210). According to an alternative embodiment the parcel terminal 100 has multiple inner consoles 220 and corresponding customer consoles 210. According to one embodiment the terminal has two inner consoles 220 and corresponding customer consoles 210. In such case the inner consoles would preferably locate on opposite column rows and the customer consoles 210 would locate on opposite outer shell walls of the console.

Description of the Mast:

The mast 300 is driven along a bottom rail 320 along the corridor 310 between the front and back shelf columns (FIG. 8). Power transmission is achieved through a drive belt running along the mast rail and being fixed to the rail at its both ends. A mast drive motor/mast motor is located on top of the mast 300 and it moves with the mast 300. The lower section of the mast 300 comprises a carriage, through which the mast 300 is connected to the bottom rail 320 and to the mast's drive belt. The carriage holds drive rollers, through which the mast 300 is connected to the rail, and the rollers of the drive belt system, through which power is transmitted to the drive belt.

The mast 300 has two lifts, which move two loaders 400 vertically. The two loaders are moved vertically along the mast 300 independently of each other (FIG. 11). The loaders 400 are attached to opposite sides of the mast 300, such that they can extend horizontally perpendicularly to the direction of the bottom rail 320 (FIG. 11). The actuators of the lifts are located next to the motor of the mast.

On the mast 300, above the actuators, is an electrical cabinet. At the upper end of the mast 300, there are support rollers, which drive along the upper rail 330 that is fixed to the ceiling frame 170 to prevent lateral movement of the mast 300.

Description of the Loaders:

Two loaders 400, locate on the mast 300 and can be moved independently of each other vertically along the mast 300. The loaders are attached on opposite sides of the mast 300 in direction parallel to the corridor 310 along which the mast 300 is moving. The parcel terminal 100 can function as described here, because the distance between an outer edge of one loader 400 (measured in direction of the corridor 310 along which the mast 300 is moving) and the outer edge of the second loader (measured in direction of the corridor 310 along which the mast 300 is moving) (shown in FIG. 7 as D) is such that when the mast 300 moves along the bottom rail 320 along the corridor 310 and brings one of the loaders 400 in front of the inner console 220, the other loader 400 necessarily locates in front of a column 130. According to a preferred embodiment the distance D is such that, as is shown in FIGS. 6A and B, the second loader 400 locates in front of the third shelf column away from the inner console 220 when the first loader 400 locates in front of the inner console 220. In the embodiment shown in FIGS. 6 A and B, this means that the width of the two loaders 400 and the width of the mast 300 has to be same as width of four columns 130.

Now referring to FIG. 12, each loader 400 consists of a telescopic arm 430, which moves horizontally in relation to the loader 400, and an inner loader 420, which moves horizontally in relation to the telescopic arm. The movement direction of the telescopic arm 430 and the inner loader 420 is perpendicular to the movement direction of the mast 300. The inner loader 420 holds a horizontally moving magnetic head 440 at its distal end. The magnetic head has two electromagnets 442 and 444 facing to opposite directions along the moving direction of the inner loader 420, which enables platforms to be picked up from columns 130 on both sides of the loader 400. FIG. 10 shows a platform 600 with a metallic plate 610 which an electromagnet 442, 444 of the loader will attach to. According to a preferred embodiment, a loader 400 is capable of moving platforms 600 to and from the inner console 220 and to and from the columns 130.

Now referring to FIG. 13 A, B: In FIG. 13 A upper figure the magnetic head 440 is at the end of the loader 400 and attached to a platform 600. In the lower figure of 13 A, the magnetic head 440 moves to the other end of the loader 400 thereby pulling the platform onto the loader 400. The telescopic arm 430 or the inner loader 420 are not needed to extend in this case. This configuration is preferable when the platform 600 is pulled from a column 130—there is no need for the telescopic arm or the inner loader to reach into the column. In FIG. 13 B on the upper figure the platform 600 is now on the loader 400 and in the lower figure the magnetic head 440 moves to the other end of the loader 400 thereby pushing the platform 600 out into a column. Again, there is no need to extend the telescopic arm 430 or the inner loader 420. The preferable situation when this mode is used is when a platform 600 is inserted into a column 130.

Now referring to FIG. 14 A, B: In FIG. 14 A upper figure the platform 600 is on the loader 400 and the magnetic head 440 is attached to the magnetic plate 610 of the platform 600. In the lower figure of 14A a, the telescopic arm 430 and the inner loader 420 are both extending out, and the magnetic head 440 is in its utmost distal position pulling the platform 600 far out. This mode is preferable when the platform 600 is to be inserted into the inner console 220 which preferably is deeper than a column 130. In the case shown in 14 A lower drawing, the platform 600 would fully locate inside the inner console 220 and the customer would see the platform 600 in the console 220 and would be able to remove a parcel from the platform 600 if the platform was inserted into the console for picking up a parcel, or inserting a parcel if the platform was empty.

In FIG. 14B upper figure the platform 600 again locates on the loader 400, however this time such that the magnetic head 440 is 'behind' the platform 600 pushing it and the inner loader 420 does not need to be pushed all the way out in order to get the platform into the console.

Outer Housing of the Loader

The outer housing 410 of the loader 400 consists of side profiles and their connection beams. The base of the loader 400 may be closed or open. In case of being closed it is covered by a housing base cover, which also serves as a sliding surface for the telescopic arm's cable chain. Cameras 460 are located at the ends of one side of the outer housing. Position sensors are located on the sides of the side profiles.

The cameras are used for the initial setup of the loader 400; later, when the machine is already in service, the cameras are used for automatically adjusting and checking the position of the mast 300. The cameras are always in the same position relative to the loader 400 and they make it possible to identify the position of the loader 400 relative to the shelves. To protect the cameras from any possible damage, they are placed in a separate housing, which also ensures that the position of the cameras always remains constant. For focus adjustments, there is an opening at the bottom of the housing, which enables access to adjust camera's lens, although a camera with automated lens adjustment may as well be used.

According to one embodiment, the side profiles of the outer housing 410 of the loaders 400 are equipped with rails, which are used for moving a platform 600 when it is on the loader 400. The rails are mounted in a groove of the side profiles and can be easily replaced, if necessary. The material of the rails is highly durable and strong, such as polyoxymethylene i.e. polyacetal or similar, which ensures their long life and the capacity to carry maximum weight packages.

There are position sensors in the outer housing detecting the position of the platform on the loader 400 as well as whether or not a magnet is holding the platform. There is an opening in the housing base cover, through which the necessary cables enter the loader 400. Additionally, near the opening there is a junction box which collects the signal of all position sensor of the loader 400. One of the side profile connection beams holds the telescopic arm's home sensors, which is installed in such a way that the telescopic arm 430 is considered to be in the 'home' position when closed and does not need to move during zeroing.

Telescopic Arms of the Loaders

The telescopic arm 430 of each loader 400 consists of two rail modules (not shown) located on the sides of the telescopic arm. The two rail modules are connected by a drive shaft (not shown) and a connection plate (not shown). The rail modules consist of two rail profiles, along which inner and outer carriages are driven (not shown). The outer carriages (not shown) are fixed to the side profiles of the outer housing 410 of the loader 400. The inner carriages (not shown) are fixed to the sides of the inner loader 420.

Between the rail modules there is a drive belt system. The drive roller and the guide rollers of the drive belt system are located at one end of the rail modules, which helps maximizing the telescopic arm's range of movement. The angle of the endmost rollers of the drive belt system can be easily adjusted from the end of the rail module, to ensure that the movement of the drive belt is as linear as possible. A drive shaft connecting the rail modules ensures the synchronous movement of the drive belts of both rail modules.

The rail modules are fixed via the drive belts to the outer housing 410 of the loader 400 at the lower side of the rail module and to the inner loader 420 at the upper side of the rail module. The telescopic arm 430 is driven by an actuator with a right-angle reducer or right-angle drive, which moves with the telescopic arm.

Inner Loader

The inner loader 420 consists of a base plate and side profiles. The inner loader 420 is connected via the side profiles to the drive belt of the telescopic arm's rail module. Under the inner loader's base plate is the magnetic head's actuator with guide rollers. The actuator is located as far back as possible at one end of the loader 400 to maximize the range of movement of the telescopic arm 430. Under the base plate, by the actuator of the magnetic head, the drive belt runs across the endmost rollers onto the base plate, where it attaches to the magnetic head. The angle of the endmost rollers of the drive belt system can easily be adjusted, to ensure that the movement of the drive belt is as linear as possible. The magnetic head 440 drives along linear guides, which are fixed to the base plate. The energy chain of the magnetic head is located beside the magnetic head. There is a home sensor for the magnetic head 440 at one end of the inner loader 420.

Magnetic Head

The magnetic head 440 consists of two electromagnets 442 and 444, four pushers and a housing which joins them together. The two electromagnets are facing to opposite directions, such that one is facing toward the direction to which the inner loader 420 is extending and the other one to the opposite direction. The electromagnets are capable of moving in relation to the outer housing 410, which makes it possible to compensate for any potential platform- or loading-position inaccuracies. The electromagnets jut out from the outer housing 410 to the extent that is necessary to reach across the edge of the loader 400 to grab platforms 600 placed on a shelf (by shelf it is meant here the location in the column 130 where the platform can be supported) in both end positions of the magnetic head 440. The pushers are located on the sides of the electromagnets 442, 444. The pushers are connected to a sensor that provides a signal to define whether or not the platform is attached to the magnet. The pushers also help to push the platform away from the magnet if any residual magnetism should occur, so as to ensure that the platform is not attached to the magnetic head 440 when the loader 400 starts moving.

Example 1. Loader Work Process

Case 1 a Platform is Loaded onto an Empty Loader

The loader 400 is not holding a platform 600. The loader 400 moves vertically on the mast 300 to a platform placed on a shelf (i.e. is supported by the support rails). The magnetic head 440 moves into its end position, during which the electromagnet 442, 444 and pushers move against the magnetic plate 610 of the platform 600. The electromagnet is activated, and the pushers are now level with the electromagnet. The sensor sends out a signal to indicate that the platform 600 is attached to the electromagnet 442 or 444. The magnetic head 440 moves toward the other end of the loader 400, but not to the end position, by stopping instead as soon as the platform 600 is on the loader 400. Moving to the end position would mean that the electromagnet on the side would jut out over the edge of the loader 400. Once the platform 600 is on the loader 400, the mast 300 can begin moving. In pulling platforms 600 onto the loader 400, it does not matter whether the platforms 600 are to be taken from the back-row columns 134 or from the front-row columns 132.

Case 2 a Platform Loaded onto the Loader is Moved to a Column

A platform 600 has been pulled onto the loader 400 from a front-row column 132 or from a back-row column 134. A platform 600 can only be loaded back to a column on the same side from which it was taken. Once the mast 300 has moved into the appropriate position, the magnetic head 440 pushes the platform 600 by moving into its end position into the console 220 between rails or other supporting means to keep the platform 600 supported in the column. In the end position, the magnetic head 440 juts out over the edge of the loader 400 and the platform 600 is pushed against the platform limiter located behind the shelves. The electromagnet 440 releases the platform 600 and the magnetic head 444 moves back inside the loader 400. At the same time, the pushers push the platform 600 against the platform limiter located inside the column, so as to ensure that the platform is not pulled back due to residual magnetism.

Case 3 a Platform on the Loader from a Front Side (Console-Side) Column is Brought to the Console for a User to Load A platform 600 has been pulled onto the loader 400 from a front-row (console-side) column 132 and is brought to the console 220. The loader 400 reaches the console 220. In this case, the magnetic head 440 is located behind the platform 600. The magnetic head 440 begins moving into the console-side end position. Once the magnetic head 440 has reached the end position, there is still a short distance to go for the platform 600 to be fully inside the console 220. This final movement is performed by the loader's telescopic arm 430, which moves the platform 600 into the loading position inside the console 220. After the platform 600 has been loaded, it is moved back onto the loader 400. Once the platform 600 is on the loader 400, it can be placed back onto a front-row (console-side) column 132.

Case 4 a Platform on the Loader from a Back-Side Column is Brought to the Console A platform 600 has been pulled onto the loader 400 from a back row column 134 and is brought to the console 220. The loader 400 reaches the console 220. In this case, the magnetic head 440 is located between the console 220 and the platform 600. The magnetic head 440 begins moving into the console-side end position. Once the magnetic head 440 has reached the end position, it still needs to move with the platform 600 fully to the front of the console for the platform 600 to be fully inside the console 220. This final movement is performed by the loader's telescopic arm 430, which moves the platform 600 into the loading position inside the console 220. After the platform 600 has been loaded, it is moved back onto the loader 400. Once the platform 600 is on the loader 400, it can be placed back into a column across from the console 220.

Example 2. Parcel Retrieval

The motion detector of the customer console 210 detects an approaching customer. Instructions for entering a PIN code or scanning a QR code are displayed on the screen for the customer.

The system identifies location of the platform 600 holding customer's parcel in the parcel terminal 100. Once the location is identified, the system identifies the nearest of the two loaders 400 to the parcel for loading the platform 600 holding the parcel onto the loader 400. The mast 300 moves and the platform 600 holding the parcel is moved by the action of the loader 400 and the telescopic arm 430 into the inner console 220 loading position and the loader 400 loads the platform 600 into the inner console 220.

The customer console 210 door is opened and the customer can retrieve the parcel from the customer console 210.

The door is closed, and the empty platform 600 is loaded onto the loader 400 from the inner console 220.

The code for the next parcel can be entered, during which time the mast 300 moves the empty platform 600 onto a column 130.

Example 3. Parcel Entry

The motion detector detects an approaching customer (courier). Instructions for entering a PIN code or scanning a QR code are displayed on the screen for the customer. The customer console 210 door is opened to enable faster parcel entry.

The mast 300 moves into a position in which one of the loaders 400 moves an empty platform 600 into the inner console 220, while the other loader 400 is at a fast-loading column and simultaneously takes an empty platform 600 from the fast-load column.

Once the courier has entered a parcel onto the empty platform 600 in the inner console 220, the platform 600 is pulled onto the loader 400. The mast 300 moves such that the loader 400 having the platform 400 with the parcel comes at a fast-load column, and simultaneously by default the empty platform 600 on the second loader 400 is moved into the console 220 loading position. The loader 400 with the platform 600 having the parcel moves the platform 600 into the fast-load column and at the same time the courier may insert another package on the empty platform 600 on the other loader 400.

Loading can be continued like this until there is no more free space in the fast-load columns. The parcel terminal 100 of this disclosure on fast loading module uses approximately 6-7 seconds from the courier keying in an PIN code to the final positioning of the platform 600 with the parcel into a fast-load column. This is more than two times faster than with any other known system. Given that parcel terminals today are a popular system for postal and courier services to deliver packages, and that one courier may have tens or even hundreds of packages, the time saving the current invention provides is remarkable.

Once the fast-load columns are full, the parcels are loaded into the columns between the console column and the fast-loading column—i.e. quick-load columns. In such a case, it is no longer possible for one of the loaders 400 to be constantly in the console loading position. This increases the time needed for removing platforms 600 from the console 220 and placing them in the zone between the console column and the fast-loading column. However, even with the quick load mode the system is still faster than other known loading systems.

Once the quick load columns are also full, any further parcels are placed into columns located further away from the fast-loading column (normal-load columns). Loading is possible until there are either no more free shelves or empty platforms in the machine.

According to one embodiment of the invention there is also a force empty mode: When the terminal idles for a predetermined time period (e.g. 5 minutes) or the next data for insertion is not scanned/entered within the predetermined time then the Force empty-mode will begin. The force empty-mode means that the mast 300 will automatically move to a suitable position to allow the loaders 400 to empty the fast-loading columns and move the platforms 600 with parcels from the fast-loading columns to the normal-loading columns. Empty platforms 600 are inserted into the fast-loading columns. By this means the Fast-loading columns are not meant to be permanent storage for the parcels but they are constantly emptied to prepare the system for the next insertions. The identification of the parcel location is related to the platform 600 on which the parcel is and the system is programmed to update the location of the platform 600 every time it is moved.

In an alternative embodiment the courier may choose to take a pause and force the machine to empty fast-load columns before inserting more parcels.

Example 4 Fast Loading, Quick Loading and Normal Loading Step by Step

The device and method according to this disclosure provides three loading speeds for parcels. FIG. 15 illustrates the decision making of the system and the steps are described below step by step. (Note in this figure and the description below, the platform is assumed to be a tray, but other forms are possible as discussed above).

Step 1: User (courier) approaches to the parcel terminal 100, the motion detector on the customer console 210 detects a person near the console. The display lit up with a welcome screen.

Step 2: The parcel terminal 100 requests the user to identify if he/she would like to pick-up or return goods (END-USER mode), load goods (COURIER mode) or service the unit (SERVICE mode)

Step 3: The user enters data via touch sensitive glass panel that also contains scanner and RFID reader (located at lower part of the outer console), the system checks the input information and concludes what to do next. For blind users, a user interface for visually impaired people is provided (e.g. earphone input/soft and directing/guiding/helping Braille). After that, it is established, on the basis of the details entered by the user in the user interface (UI), whether the user wishes to insert or retrieve parcel(s), or service the machine.

Step 4: The parcel terminal 100 recognizes data for parcel insertion i.e. courier mode Step 5: Customer console 210 door opens for faster insertion. This mode will be available only for the trained couriers (the door will remain open during the courier mode)

Step 6: Parcel terminal 100 checks if Fast-loading is available.

Step 7: Parcel terminal 100 detects that Fast-loading is available.

Step 8: The mast 300 moves to Fast-loading position #1 which means that an empty loader L2 is at Fast-loading column and a loader L1 with empty tray is at console.

Step 9: L2 loader loads an empty tray from Fast-loading column and L1 loader unloads empty tray into the console 220.

Step 10: Empty tray at console 220 is filled with parcel, the tray with parcel is loaded to L1 loader and L2 loader simultaneously moves vertically to console height.

Step 11: The mast 300 moves to Fast-loading position #2 which means that the loader with an empty tray (L2) is at the console and the loader with parcel on the tray (L1) is at Fast-load column.

Step 12: L1 loader unloads tray with the parcel to Fast-loading column and L2 loader unloads empty tray to the console 220.

Step 13: L1 loader moves vertically to a height of an empty tray in the fast-load column and simultaneously the empty tray at the console 220 is filled with parcel.

Step 14: L1 loader loads an empty tray and L2 loader loads the tray with parcel from the console 220.

Step 15: The mast 300 moves to Fast-loading position #1: which means that the loader with an empty tray (L1) is at the console 220 and the loader with parcel on tray (L2) is at the Fast-loading column.

Step 16: The parcel terminal 100 checks whether there are more parcels to be inserted. If the UI is exited, or there is no activity (e.g. for 60 sec), the terminal turns to idle and process will end. The terminal 100 may turn at force empty mode at this point.

Step 17: If data for next insertion is scanned/entered, the process will begin again (continue) at the point where it was checked if there is Fast-loading available—process will loop until the step 18.

Step 18: Parcel terminal system identifies that Fast-loading is not available.

Step 19: Parcel terminal system checks if quick-loading is available.

Step 20: Parcel terminal system detects that quick-loading is available.

Step 21: A loader 400 with an empty tray moves to front of the console 220.

Step 22: The loader 400 unloads the empty tray to the console.

Step 23: The empty tray at console 220 is filled with a parcel.

Step 24: The tray with the parcel is loaded to the loader 220.

Step 25: The mast 300 finds quickest route (shortest distance) within quick-loading columns to meet two conditions simultaneously: 1st condition: the tray with the parcel can be stored in a quick-loading column, and 2nd condition: an empty tray will be loaded on to the second loader.

Step 26: The mast 300 moves to bring the loader 400 with an empty tray to console 220.

Step 27: Parcel terminal checks if there are more parcels to be inserted. If the UI is exited, or there is no activity for 60 sec, the terminal 100 turns to idle and process will end.

Step 28: If data for next insertion is scanned/entered, the process will begin again at the point where it was checked if there is Fast-loading available—process will loop until the step 29.

Step 29: Quick-loading is not available.

Step 30: Parcel terminal system checks if normal-loading is available.

Step 31: Parcel terminal system detects that normal-loading is available.

Step 32: The mast 300 moves to allow a loader 400 to load an empty tray on it and move the loader with the empty tray to the console 220.

Step 33: The empty tray at console is filled with parcel.

Step 34: The mast 300 finds an empty place for the tray within normal-loading columns.

Step 35: The mast 300 moves to position where the loader 400 can unload the parcel within normal-loading columns.

Step 36: Parcel terminal system checks if there are more parcels to be inserted. If the UI is exited, or there is no activity for 60 sec, the terminal 100 turns to idle and process will end.

Step 37: If data for next insertion is scanned/entered, the process will begin again at the point where it was is-checked if there is Fast-loading available—process will loop until the step 38.

Step 38: Normal loading is not available or there is no empty tray in the parcel terminal, or there is no place to store the parcel.

Step 39: Parcel terminal is full and the UI shows that message to user.

ELEMENT NUMBERS 100 parcel terminal
110 outer shell
120 inner frame
130 parcel columns
132 front row column
134 back row column
140 base frame
170 ceiling frame
180 support frame
190 shelf post
210 customer console
220 inner console
230 console rails
300 mast
310 corridor
320 bottom rail
330 upper rail
400 loader
410 outer housing
420 inner loader
430 telescopic arm
440 magnetic head
442, 444 electromagnet
460 camera
500 module
510 console containing module
520 non-console containing module
600 platform
610 metallic plate

The invention claimed is:

1. A parcel terminal for inserting and receiving parcels, said terminal comprising:
    at least one insert and discharge area comprising a customer console for user identification, and parcel insert or retrieval;
    a frame comprising two rows of columns each column having equal width and being suitable for storing a multitude of platforms, each platform configured to hold a parcel, wherein at least one of the columns is accessibly connected to the at least one insert and discharge area; and
    a mast configured to move along a corridor between the two rows, said mast comprising two loaders attached on opposite sides of the mast in direction of the corridor;
    said loaders being capable of independently moving vertically along the mast, and said loaders extend horizontally and perpendicularly to the direction of the corridor towards either one of the rows of columns; wherein
    a combined width of the loaders measured in direction of the corridor, and a width of the mast is such that when one of the loaders is positioned at the column with access to the at least one insert and discharge area, the other loader on the opposite side of the mast is positioned at a fast-loading column by default, thereby allowing simultaneous loading of a parcel at the at least one insert and discharge area and unloading of a parcel at the fast-loading column.

2. The parcel terminal according to claim 1, wherein the mast has a width measured in the direction of the corridor that equals to a width of two columns, and a combined width of the two loaders, and the mast equals a width of four columns.

3. The parcel terminal according to claim 1, wherein each loader comprises:
    an outer housing, a telescopic arm, and an inner loader, wherein the telescopic arm and the inner loader are capable of extending outside the outer housing at least in one direction.

4. The parcel terminal according to claim 3, further comprising a magnetic head having two electromagnets facing opposite directions, wherein each electromagnet faces toward a row of columns, the magnetic head is located on the inner loader and is capable of moving along the inner loader toward a direction of either one of the rows of columns.

5. A computer controlled method for operating a parcel terminal system comprising a parcel terminal and computer implemented controls; said parcel terminal comprising:
    two column rows;
    a corridor in between the rows;
    said column rows comprising a multitude of columns having equal width in direction of the corridor, said columns being suitable for storing a multitude of empty platforms, said platforms are each configured to hold a parcel;
    a first and a second vertically and horizontally moving loader attached to a mast, said mast is configured to move along the corridor, and
    at least one insert and discharge area;
    said method comprising the steps of:
    a) inserting a parcel into or onto an empty platform provided on the at least one insert and discharge area;
    b) receiving data of a location of empty platforms in the parcel terminal, and based on the data, initiate movement of the mast along the corridor to a position where the first loader locates in front of the at least one insert and discharge area, and the second loader locates in front of a column with an empty platform;
    c) initiating the parcel terminal system to load the platform with the parcel from the at least one insert and discharge area onto the first loader, while simultaneously loading the empty platform onto the second loader from the column located by the second loader;
    d) receiving data of location of a column with empty space, and initiating movement of the mast along the corridor to a position where the first loader with the parcel containing platform locates in front of the determined column having empty space, and initiating the second loader with the empty platform to move in front of the at least one insert and discharge area;
    e) initiating the first loader to upload the platform with the parcel onto the empty space, while simultaneously initiating the second loader with the empty platform to load the empty platform onto the at least one insert and discharge area for another parcel to be inserted into or onto the platform; and
    f) repeating the steps b) and e) until no empty columns are recognized.

6. A method for providing multiple speeds for storing parcels in a parcel terminal, the multiple speeds comprising at least a first, a second and a third mode, wherein the first mode is the fastest and the third mode is slowest, wherein:
    in the first mode a first parcel is inserted into or onto a first platform brought by a first loader to an insert and discharge area simultaneously as a second loader is retrieving an empty second platform from a fast-load column of the terminal, and wherein the first loader is unloading the first platform with the first parcel into a fast-load column simultaneously as the second loader provides the second empty platform to the insert and discharge area for a second parcel; and when the second loader unloads the second parcel into the fast-load column, the first loader simultaneously provides a third empty platform into the insert and discharge area for a third parcel, wherein the process is repeated as long as there are empty storage spaces in the fast-load columns;

in the second mode a first parcel is inserted into or onto a first platform brought by a first loader to an insert and discharge area, the first loader moves to a closest possible quick-load column that is recognized to have empty storage space, and the first platform with the first parcel is unloaded to the quick-load column, simultaneously as the second loader loads an empty platform from a quick-load column, and wherein the second loader moves to provide the second empty platform into the insert and discharge area to insert a second parcel into or onto the second platform, and the second loader is moves to a closest possible quick-load column recognized to have empty storage space, and the second platform with the second parcel is unloaded to the quick-load column simultaneously as the first loader loads an empty platform from a quick-load column; wherein the process is repeated as long as there are empty storage spaces in the quick-load columns; and in the third mode the first and the second loaders operate sequentially to perform the steps of retrieving an empty platform, inserting the empty platform to the insert and discharge area and retrieving a parcel, moving the platform with the parcel to a closest possible normal-load column recognized to have empty storage area, after moving the platform to the normal-load column, the second loader or the first loader retrieves an empty platform and moves to unload the empty platform to the insert and discharge area.

7. A non-transitory computer readable medium having stored thereon a set of computer-readable instructions that, when executed by at least one processor, cause a computerized parcel terminal system to at least:
   a) recognize an empty platform at an insert and discharge area, and cause the parcel terminal to insert a parcel into or onto the empty platform;
   b) control the parcel terminal system to load the platform with the parcel from the insert and discharge area onto a first loader while simultaneously recognizing and loading an empty platform from a column onto a second loader;
   c) recognize an empty space in another column and control moving the first loader with platform containing the parcel to the recognized column and uploading the platform containing the parcel to the recognized empty space, while simultaneously controlling the second loader to load the empty platform on the insert and discharge area for another parcel to be inserted onto the empty platform; and
   d) repeat steps b) and c) until no empty space is recognized.

8. The non-transitory computer readable medium of claim 7, wherein the instructions when executed on at least one computer cause the computerized parcel terminal system to move the platforms containing parcels from one column to another to free space in predetermined columns.

* * * * *